United States Patent
Shen

(10) Patent No.: US 10,908,482 B2
(45) Date of Patent: Feb. 2, 2021

(54) MODULAR ACTION CAMERA SYSTEM

(71) Applicant: Pathway Innovations and Technologies, Inc., San Diego, CA (US)

(72) Inventor: Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 0 days.

(21) Appl. No.: 15/650,605

(22) Filed: Jul. 14, 2017

(65) Prior Publication Data

US 2018/0017850 A1 Jan. 18, 2018

Related U.S. Application Data

(60) Provisional application No. 62/362,490, filed on Jul. 14, 2016.

(51) Int. Cl.

| | |
|---|---|
| *G03B 17/56* | (2006.01) |
| *F16M 11/04* | (2006.01) |
| *H04N 13/239* | (2018.01) |
| *F16M 11/20* | (2006.01) |
| *F16M 13/04* | (2006.01) |
| *H04N 5/225* | (2006.01) |
| *H04N 5/232* | (2006.01) |
| *G02B 27/62* | (2006.01) |
| *F16M 11/10* | (2006.01) |
| *F16M 11/38* | (2006.01) |

(52) U.S. Cl.
CPC ........... *G03B 17/561* (2013.01); *F16M 11/04* (2013.01); *F16M 11/10* (2013.01); *F16M 11/2014* (2013.01); *F16M 11/38* (2013.01); *F16M 13/04* (2013.01); *G02B 27/62* (2013.01); *G03B 17/566* (2013.01); *H04N 5/2251* (2013.01); *H04N 5/2253* (2013.01); *H04N 5/232* (2013.01); *H04N 5/23203* (2013.01); *H04N 13/239* (2018.05); *H04N 2213/001* (2013.01)

(58) Field of Classification Search
CPC ...... G03B 17/04; G03B 17/561; F16M 13/04; F16M 13/06; A45F 5/00
See application file for complete search history.

(56) References Cited

U.S. PATENT DOCUMENTS

| | | | |
|---|---|---|---|
| 2008/0085112 A1* | 4/2008 | Lane ...................... | G03B 17/04 396/349 |
| 2009/0046301 A1* | 2/2009 | Asakura ................. | G01B 11/24 356/610 |

(Continued)

*Primary Examiner* — Noam Reisner
(74) *Attorney, Agent, or Firm* — Insigne LLP

(57) ABSTRACT

An action camera system is disclosed that comprises an action camera and a mount where the mount is configured to detachably couple the camera. The mount comprises a battery, a base, a body, and a vertical support. The base can be attached to a helmet, a harness, an armband, a board, or a ski pole. The battery powers the action camera when it is attached to the mount. The action camera comprises two lenses with a separate image sensor or film frame for each lens. The action camera may be connected to the mount via a folding extension. The action camera communicates wirelessly with a smartphone or a control device. The smartphone can be attached to an armband. A ski pole mount may comprise a computer, a display, and user interface.

17 Claims, 38 Drawing Sheets

(56) References Cited

U.S. PATENT DOCUMENTS

| | | | |
|---|---|---|---|
| 2011/0205425 A1* | 8/2011 | Duncan | F16M 11/041 348/373 |
| 2013/0063554 A1* | 3/2013 | Green | G01S 17/875 348/36 |
| 2016/0252800 A1* | 9/2016 | Jeong | A45F 5/00 224/576 |
| 2017/0013950 A1* | 1/2017 | Rieger | F16M 13/00 |
| 2017/0199446 A1* | 7/2017 | Ciccolini | G03B 17/08 |

* cited by examiner

MODULAR ACTION CAMERA SYSTEM

CROSS REFERENCE TO RELATED APPLICATION

This present invention claims priority to U. S. Provisional Patent Application Ser. No. 62/362,490, filed on Jul. 14, 2016, and entitled, "Modular Action Camera System," the disclosure of which is incorporated by reference herein in its entirety.

BACKGROUND OF THE INVENTION

1. Field of Invention

The present invention relates to action cameras and specifically, a modular action camera system comprising components that can be coupled together in a variety of ways to capture differing actions.

2. Description of Related Art

An action camera or action-cam is a digital camera designed for filming action while one is active. Action cameras are usually small, sturdy and water resistant. They typically record video rather than stills, and the advantage to the active user is it allows continuous capture of action with minimal camera interaction. Most action cameras record on a micro SD card, and have a micro-USB connector.

Action cameras are associated with outdoor sports, and are often an integral part of extreme sports. They are attached to helmets, surfboards, skateboards or handlebars. Several cameras may be used at once to capture alternate perspectives, such as a helmet camera that records from the actor's visual point of view combined with a secondary camera attached a board, wing, handlebar or wrist, that records the performer's reactions. Action-cams may be referred to as helmet cams and by other similar names.

The action camera category is associated with the GoPro® range of cameras, and many action cameras come with a GoPro mount adapter to take advantage of the available accessories. GoPro cameras are also controllable via Wi-Fi and Bluetooth, which is critical for a camera that may not be in hand. While GoPro cameras are popular because of their size and cost verses quality, users have reported poor battery life as a problem. A user typically buys spare GoPro batteries as backup protection. Also, users have reported that the GoPro camera's interface is not user friendly, and it often takes a lot of button presses to cycle through the camera features and change settings. Users sometimes instead use the GoPro app on a smartphone, but using the GoPro's WiFi connection drastically reduce its battery life. Also, users have found it cumbersome to control the GoPro camera via a phone during filming because it generally takes two hands to interact with the GoPro app; e.g., one hand to hold the phone and the other hand to interact with the app via the phone's touchscreen. Additionally, a GoPro type of camera is built with the battery and camera together, making it heavy to mount on the tip of any protruded support apparatus, and distracting to the person engaged in the action sport.

SUMMARY OF THE INVENTION

The present invention overcomes deficiencies of the prior art by providing a modular action camera system having components that can be coupled in a variety of ways to capture different action scenes. In an embodiment of the invention, the modular action camera system includes a mount, an optional extension arm, and a camera. The mount can be attached to any device such as, but not limited to, a helmet, a chest harness, an armband, or a ski pole. The mount houses a battery, which powers the camera. By placing the battery in the mount rather than the camera, the size of the battery pack can be increased without burdening the camera module with more weight. This has the advantage of leaving the heavier modules of the camera system near the mounting base area while the lighter weighted modules such as circuit boards and lenses can be extended out on the far end of a protruded apparatus without exerting strain on the person. However, a second battery may be included in the camera, as well, to further improve battery performance. The camera can be connected directly to the mount or through an extension arm where one end of such is coupled to the mount and the other end of such is coupled to the camera. All components are waterproof in that any electronic components housed within the system are not susceptible to damage by water or moisture contact with the system.

In an embodiment of the invention, an armband mount includes an area for securing a user's phone. The phone can be used to control the camera via an app. By securing the user's phone to the armband mount, the user frees the use of her hand on the arm on which the armband mount is placed. The camera can be connected directly to the armband mount or through an extension arm where one end of such is coupled to the armband mount and the other end of such is coupled to the camera. Alternatively, a camera is not connected to the armband mount, but rather to another mount located; for example, on a helmet or chest harness. The camera can be controlled by the user's phone on the armband mount through a wireless communications protocol such as Wi-Fi or Bluetooth.

In another embodiment of the invention, a ski pole mount is coupled on a traditional ski pole. The ski pole mount includes a display and interactive buttons on the top of the ski pole for controlling the camera. The interactive buttons are reachable by a user's fingers on the hand holding the ski pole, thereby freeing up the user's other hand. The camera can be connected directly to the ski pole mount or through an extension arm where one end of such is coupled to the ski pole mount and the other end of such is coupled to the camera. Alternatively, a camera is not connected to the ski pole mount, but rather to another mount located, for example, on a helmet or chest harness. The camera can be controlled by the ski pole mount display and interactive buttons through wires embedded in the extension structure or a wireless communications protocol such as Wi-Fi or Bluetooth. Alternatively, the ski pole mount's display and interactive buttons are supplemented or replaced by a user's phone, which would be attached to the top of the ski pole mount.

In an embodiment of the invention, an action camera system comprises: a camera, and a mount configured to detachably couple the camera, the mount comprising a battery, a base, a body, and a vertical support; wherein the vertical support is configured to rotate relative to the body, and the body is configured to rotate relative to the base; wherein the battery powers the camera when the camera is coupled to the mount. The camera comprises a male adaptor and the vertical support comprises a female adaptor configured to receive the male adaptor. The camera comprises a 3D camera with two sets of lenses. The two sets of lenses are configured to rotate about a common axis and relative to one another. The action camera system may further comprise a collapsible extension configured to detachably couple to the camera and the mount. The folding extension comprises at least two arms and a joint connecting the two arms. The folding extension is configured to rotate about its own axis.

In another embodiment of the invention, an action camera mount comprises: a mechanical connector, a base, a handle, a body, and a battery. The action camera mount may further comprise a collapsible extension. The mechanical connector comprises a female adaptor configured to receive a male adaptor of an action camera. The mechanical connector is configured to rotate relative to the body when the handle is in an open position. The mechanical connector comprises a connector with a tightening lock that secures electrical connections between the battery and an action camera. The base is configured to couple to a helmet, a harness, an armband, a board, or a ski pole. The action camera mount may further comprise an armband configured to secure a smartphone.

In yet another embodiment of the invention, an action camera mount comprises: a base, wherein the base house a battery and is configured to detachably couple an action camera; and a sleeve configured to encircle a ski pole. The action camera may further comprise a computer, a display and user interface. The action camera mount may further comprise a collapsible extension, wherein the base is detachably coupled to an action camera through the collapsible extension. The display is disposed at a top of the base and the ski pole. The sleeve is disposed at the bottom of the base.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
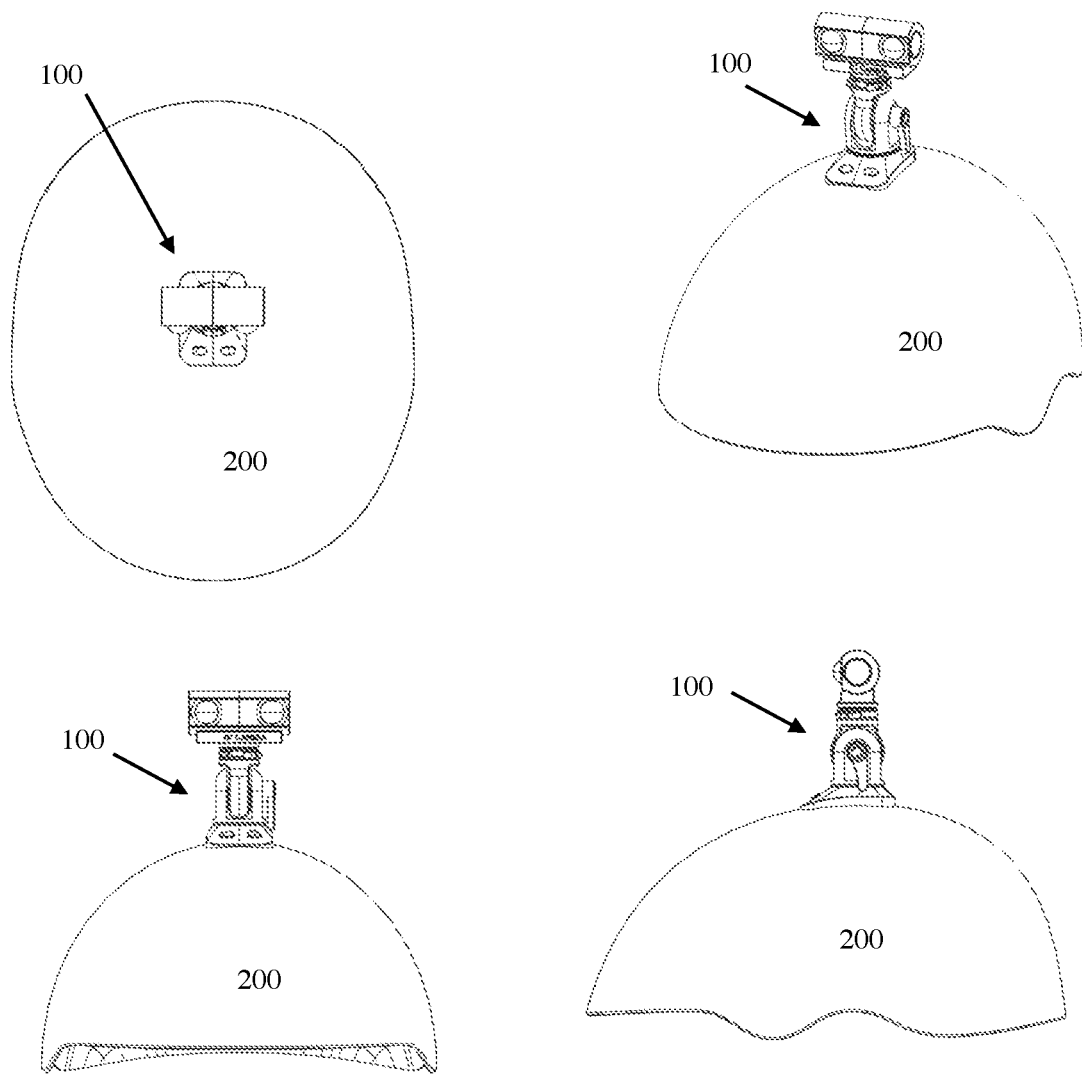
FIG. 1 illustrates different views of a modular action camera system with helmet according to an embodiment of the invention.

Preferred embodiments of the present invention and their advantages may be understood by referring to FIGS. 1-38, wherein like reference numerals refer to like elements. As used herein, the term "camera" means a portable electronic recording device capable of recording live-motion video and audio for later playback. In a preferred embodiment of the invention, the camera captures video at a high frame rate that allows for very smooth, slow motion rendering. For example, the camera captures high definition video at an output resolution of 2160p30 ("4K"), 1520p60, 1080p120, or 720p240. As described in further detail below, the camera is preferably a stereo camera having two lenses with separate image sensors, which allows the camera to simulate human binocular vision and, therefore, capture three-dimensional images. However, one of ordinary skill in the art appreciates that the invention is not limited to a stereo camera and other types of cameras may be implemented.

Figure 2:
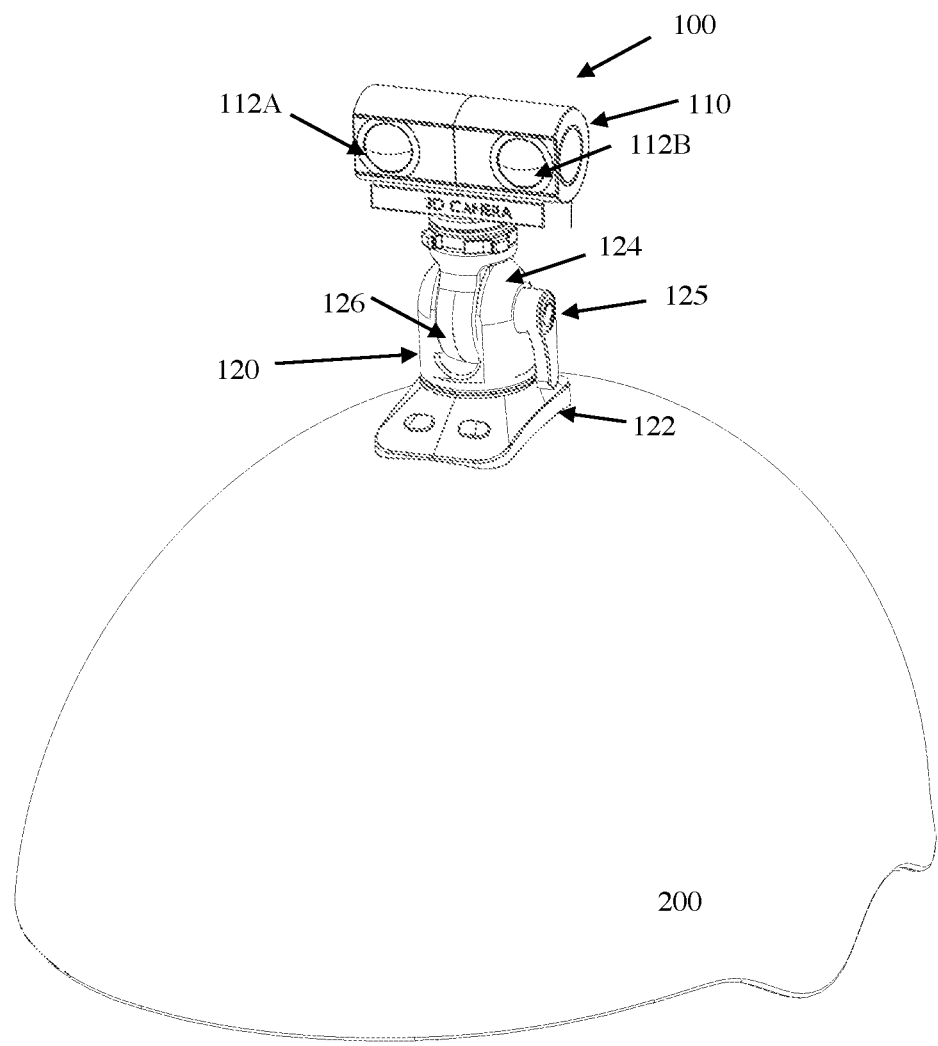
FIG. 2 illustrates a close-up view of the modular action camera system shown in FIG. 1.
Figure 3:
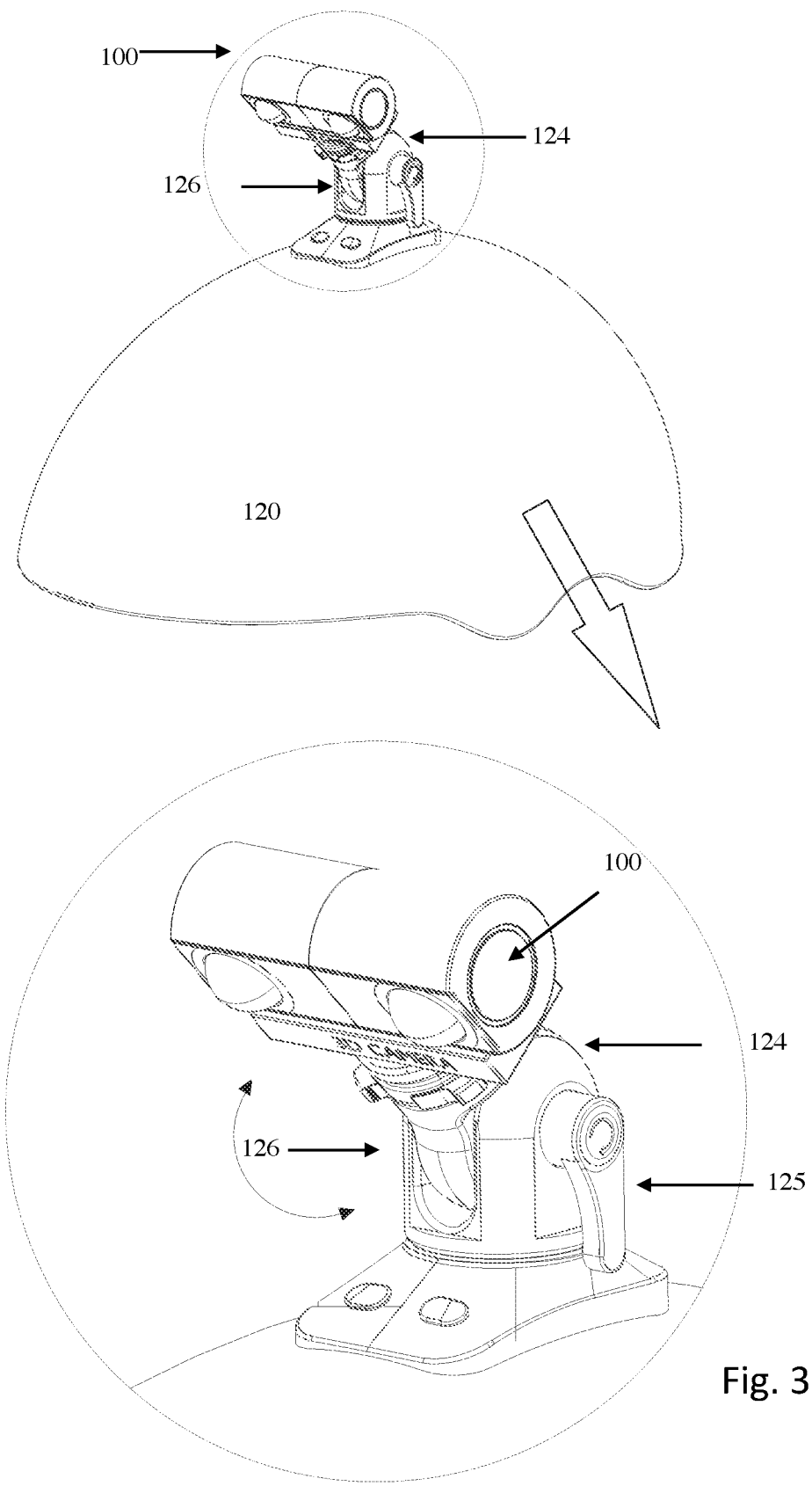
FIG. 3 illustrates vertical rotation of the modular action camera system shown in FIG. 1.

FIG. 1 illustrates top, perspective, front, and side views of a modular action camera system 100 affixed to a helmet 200 according to an embodiment of the invention. Referring to FIG. 2, the action camera system 100 comprises a camera 110 and a mount 120. The camera 110 comprises lenses 112A and 112B. The mount 120 comprises a base 122, a body 124, and a vertical support 126. The vertical support 126 is able to rotate relative to the body 124 about a horizontal axis when a handle 125 is in an open position as shown in FIG. 3. When the handle 125 is a closed position, the vertical support 126 is unable to rotate relative to the body 124. The base 122 is affixed to the helmet 200 via an adhesive or other suitable means, the implementation and identification of which is apparent to one of ordinary skill in the art. The base 122 and/or body 124 comprise an internal, rechargeable battery (not shown) that powers the camera 110.

Figure 4:
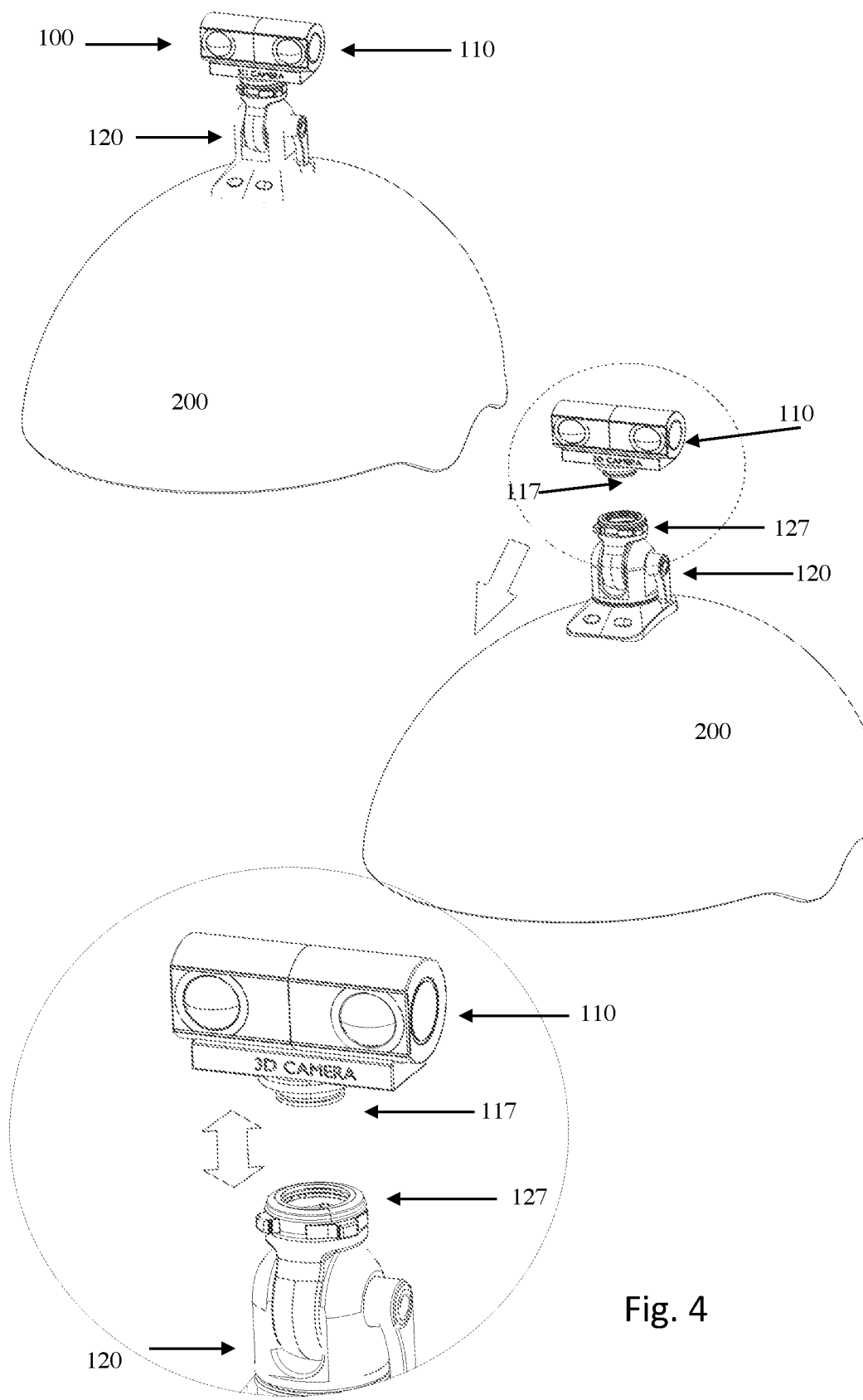
FIG. 4 illustrates separation of the modular action camera system shown in FIG. 1.

Referring to FIG. 4, the camera 110 includes a male connector 117 configured to be received by a female connector 127 on the mount 120. In an exemplary embodiment of the invention, the female connector 127 includes an electronic connector with a tightening lock that secures wiring connections between the base module and the camera module. Inside the connector's well, there are spring loaded pins that will touch firmly with the match pins on the other side once locked. In this helmet mount configuration, there is only battery power pins between these two modules. However, there are more pins built-in on the camera module side because when it is connected to a mount having a computer, e.g., a ski pole mount as discussed below, wires are included for the display signals and for control signal (button press signals) from the base to the camera 110. Upon release of the female connector 127, the male connector 117 is released and the camera 110 is detached from the mount 120.

Figure 5:
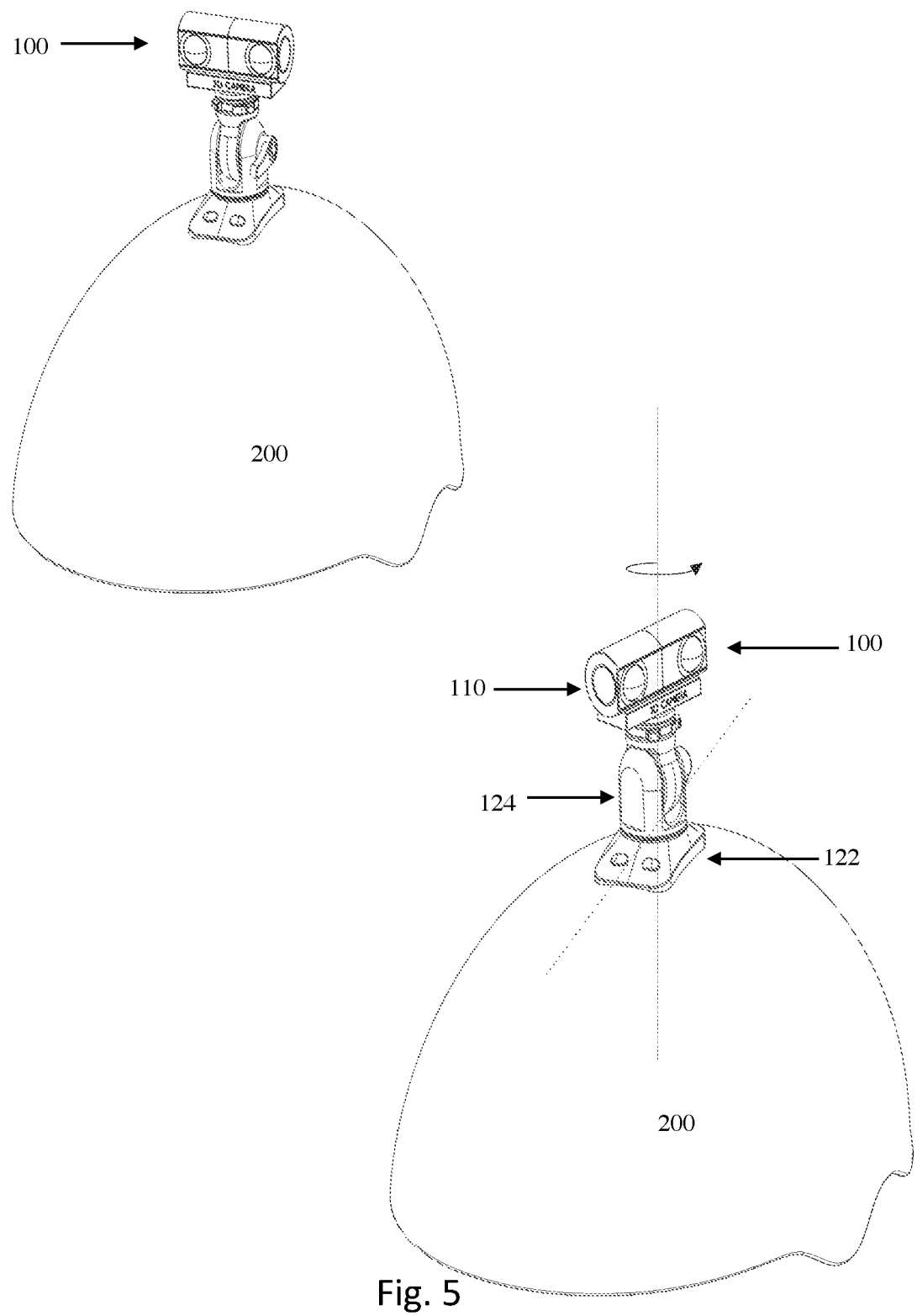
FIG. 5 illustrates horizontal rotation of the modular action camera system shown in FIG. 1.

FIG. 5 illustrates rotation of the camera 110 about a vertical axis. Here, the body 124 is able to rotate relative to the base 122. This permits the camera 110 to be positioned in any direction in a plane parallel to the base 122.

Figure 6:
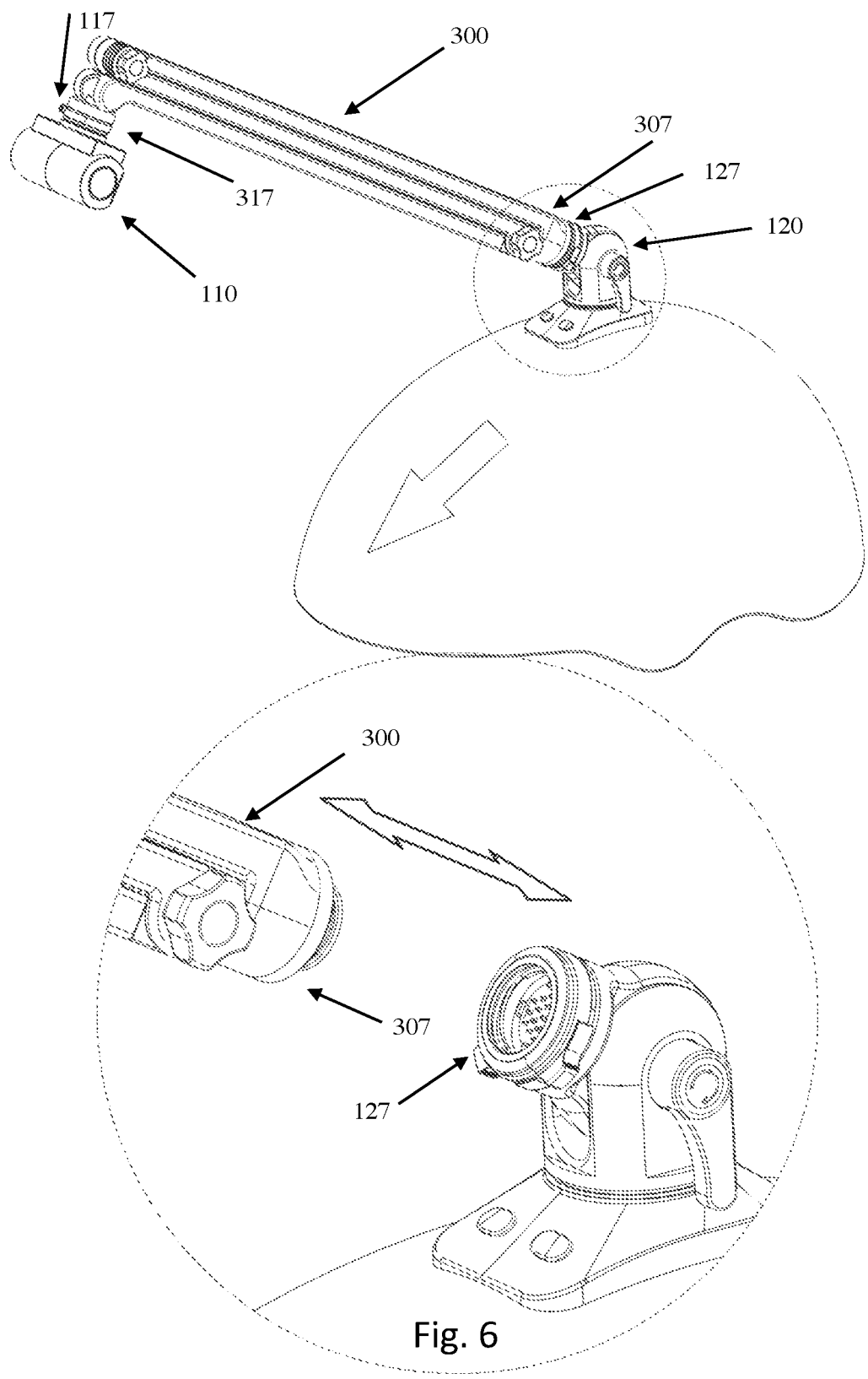
FIG. 6 illustrates inclusion of a foldable extension into the modular action camera system shown in FIG. 1.
Figure 7:
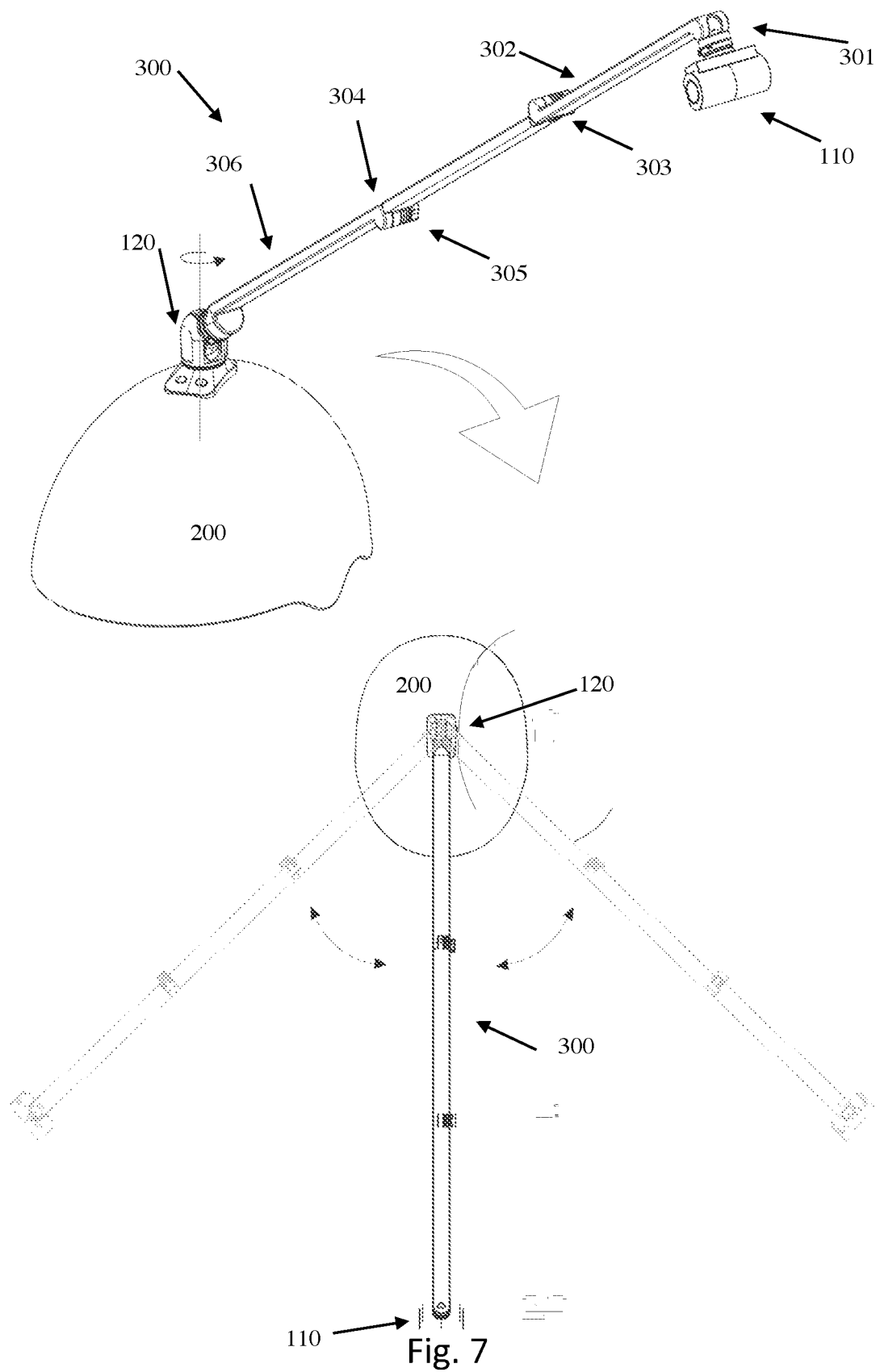
FIG. 7 illustrates the expansion of the foldable extension shown in FIG. 6.

FIG. 6 illustrates a folding extension 300 according to an embodiment of the invention. Here, the folding extension 300 comprises a male connector 307 (identical to male connector 117) at one end to attach the folding extension 300 to the female connector 127 of the mount 120. At the other end, the folding extension 300 comprises a female connector 317 (identical to female connector 127) to attach the folding extension 300 to the male connector 117 of the camera 110. Referring to FIG. 7, the folding extension 300 comprises three arms 302, 304, and 306 coupled to one another via joints 303 and 305 as shown. The camera 110 is able to rotate relative to the arm 302 via a joint 301. The camera 110 is also able to rotate relative to the mount 120 via the body 124 as described above. The folding extension 300 comprises internal wiring for powering the camera 110 by the battery in the mount 120.

Figure 8:
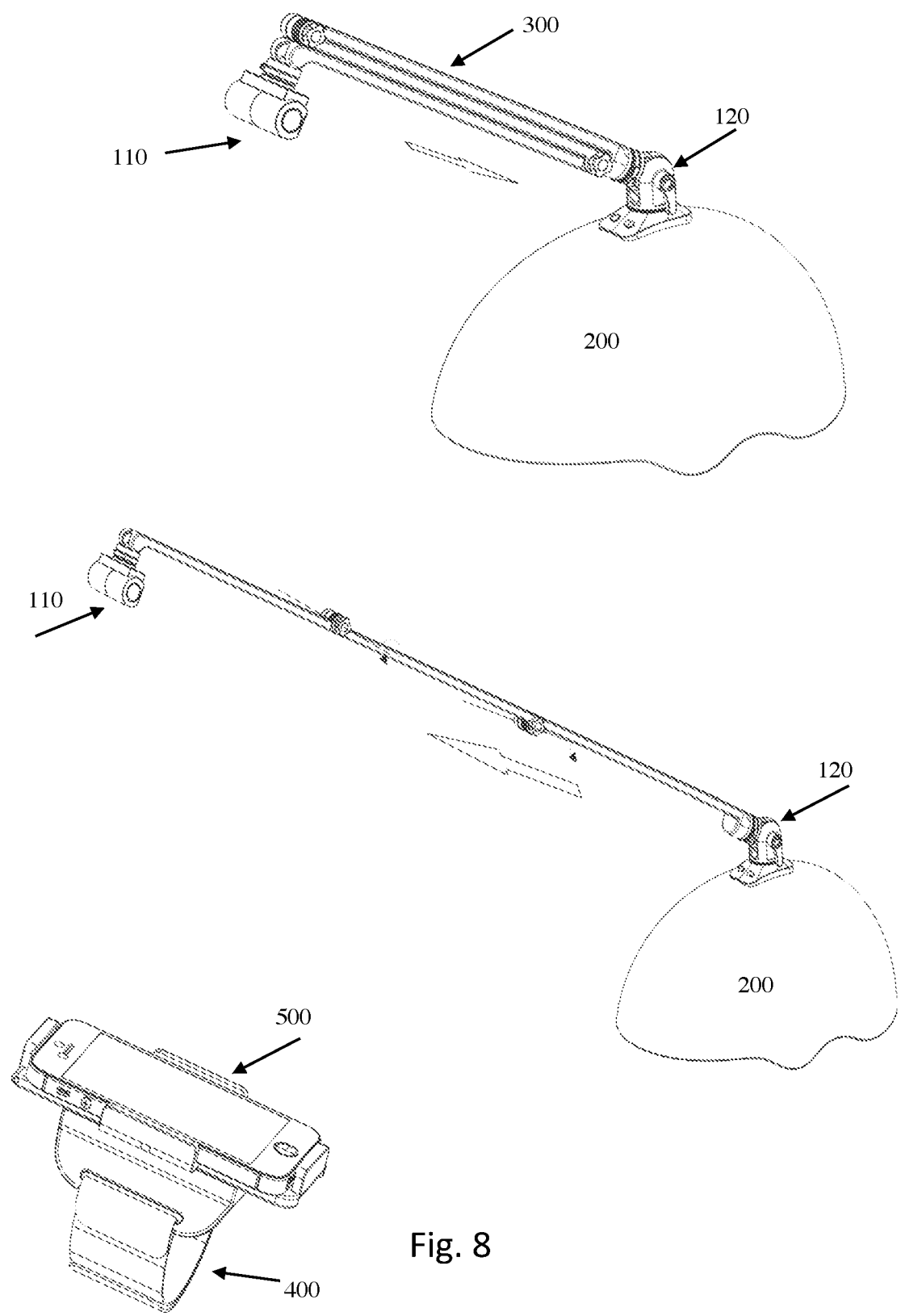
FIG. 8 illustrates adjustment of the foldable extension shown in FIG. 6 along with a smartphone armband according to an embodiment of the invention.

FIG. 8 illustrates the folding extension 300 in a folded position (top diagram) or in an extended position (middle diagram). Moreover, the folding extension 300 can be rotated about its own axis as shown. An optional armband 400 (bottom diagram) may be included for attaching a user's smartphone 500, e.g., iPhone. The camera 110 can be controlled via a wireless communications link with the smartphone 500. The wireless communications link can be a Wi-Fi or Bluetooth communications link; however, other types of wireless communications links can be used, the implementation and identification of which are apparent to one of ordinary skill in the art.

Figure 9:
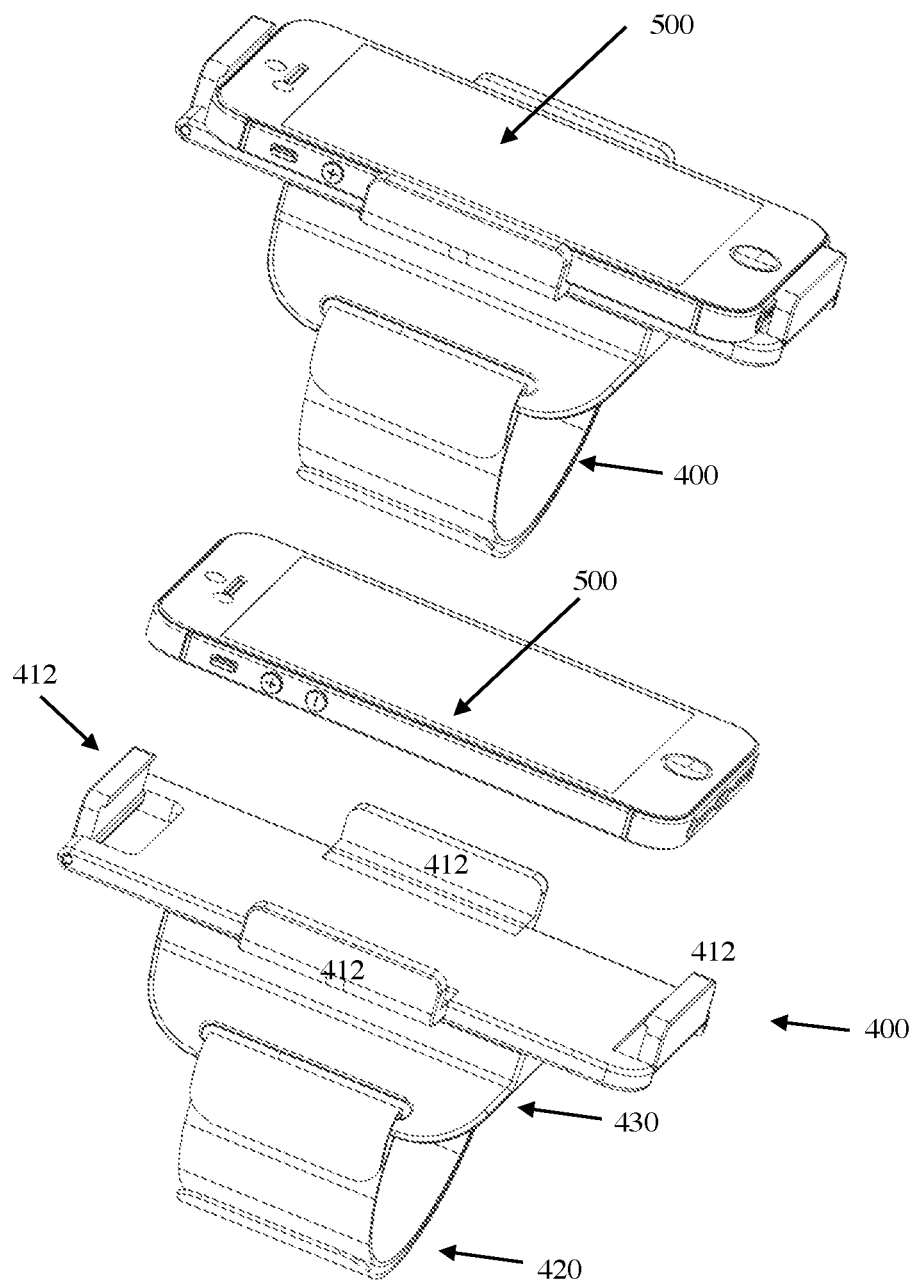
FIG. 9 illustrates the smartphone armband shown in FIG. 8.

FIG. 9 illustrates a smartphone armband 400 comprising a face 410 coupled to a band 420 via a connector 430. The face 410 comprises a guide 412 at each edge of the face 410 for securing the smartphone 500. The position of the guides 412 can be varied to receive and lock into place different sized smartphones 500.

Figure 10:
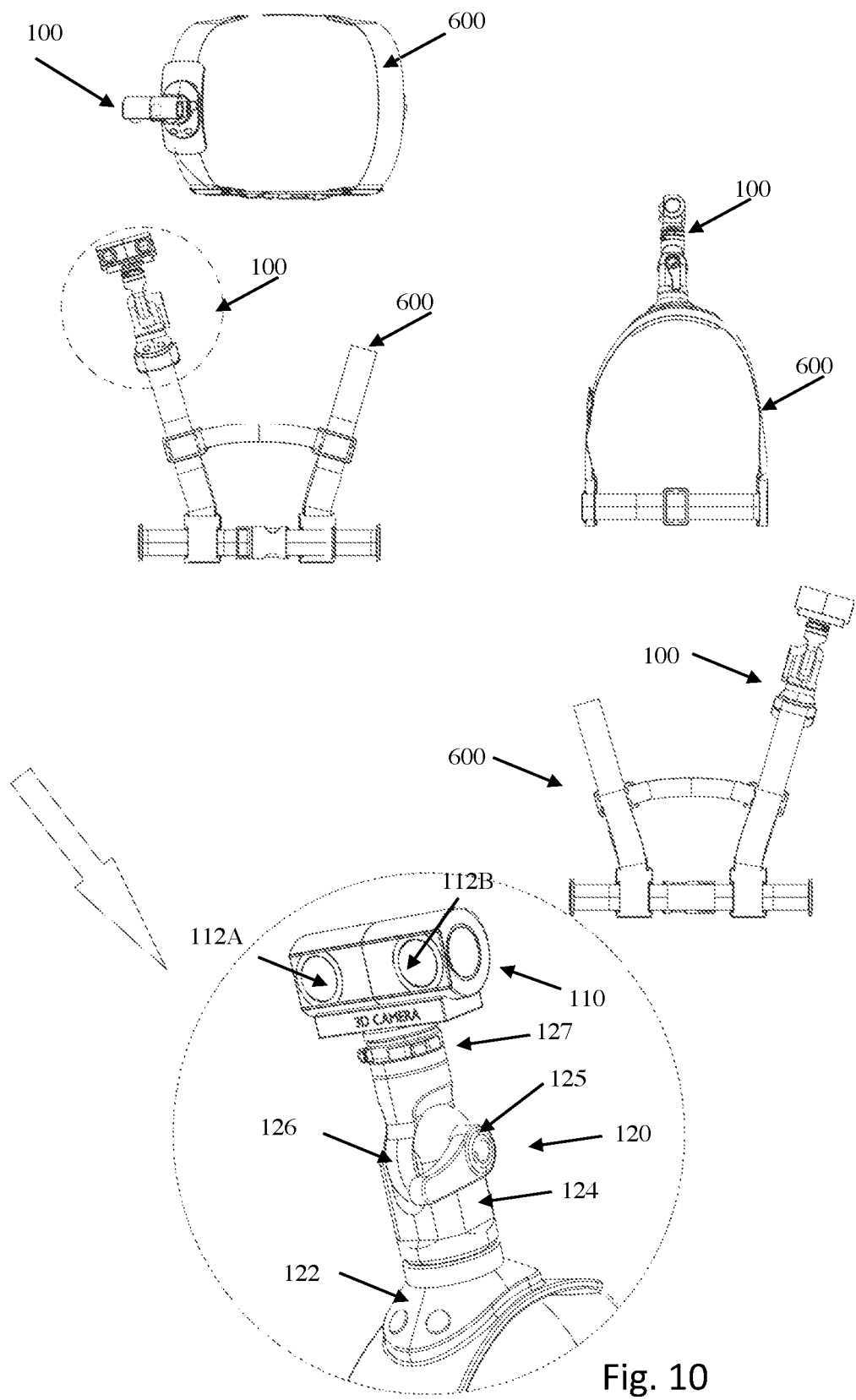
FIG. 10 illustrates a modular action camera system with chest harness according to an embodiment of the invention.
Figure 11:
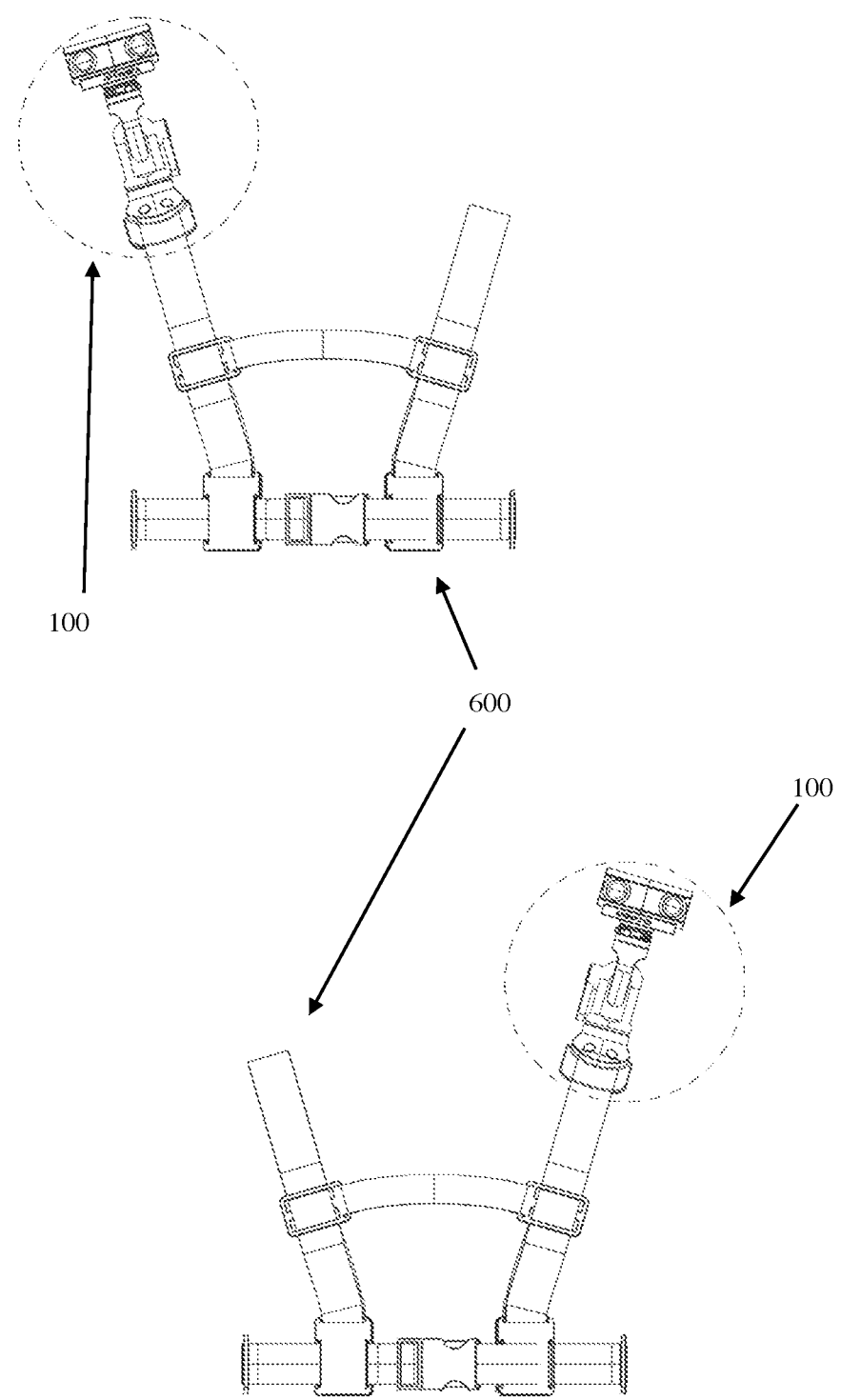
FIG. 11 illustrates the modular action camera system with chest harness of FIG. 10.
Figure 12:
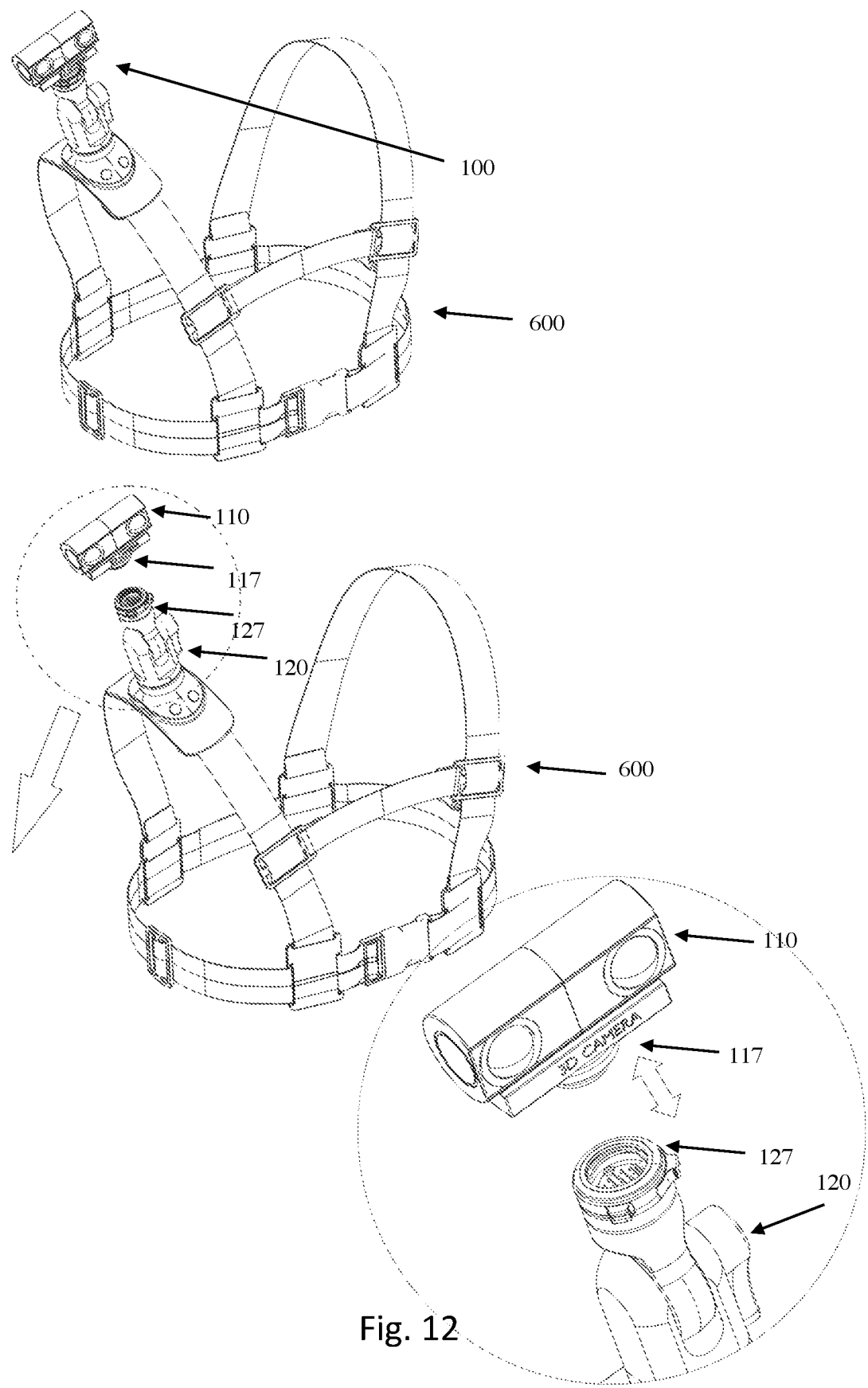
FIG. 12 illustrates separation of the modular action camera system with chest harness of FIG. 10.
Figure 13:
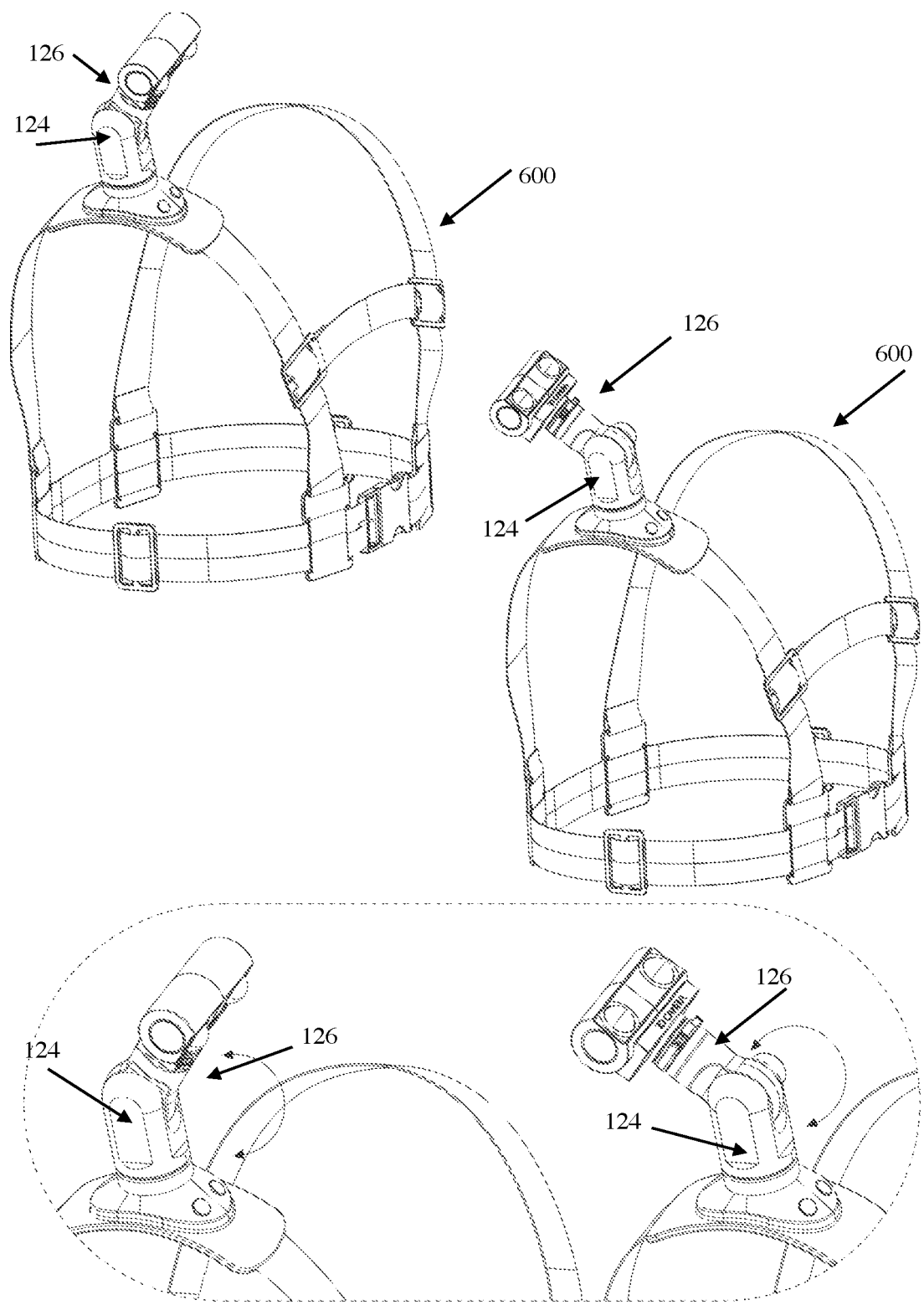
FIG. 13 illustrates vertical rotation of the modular action camera system with chest harness of FIG. 10.
Figure 14:
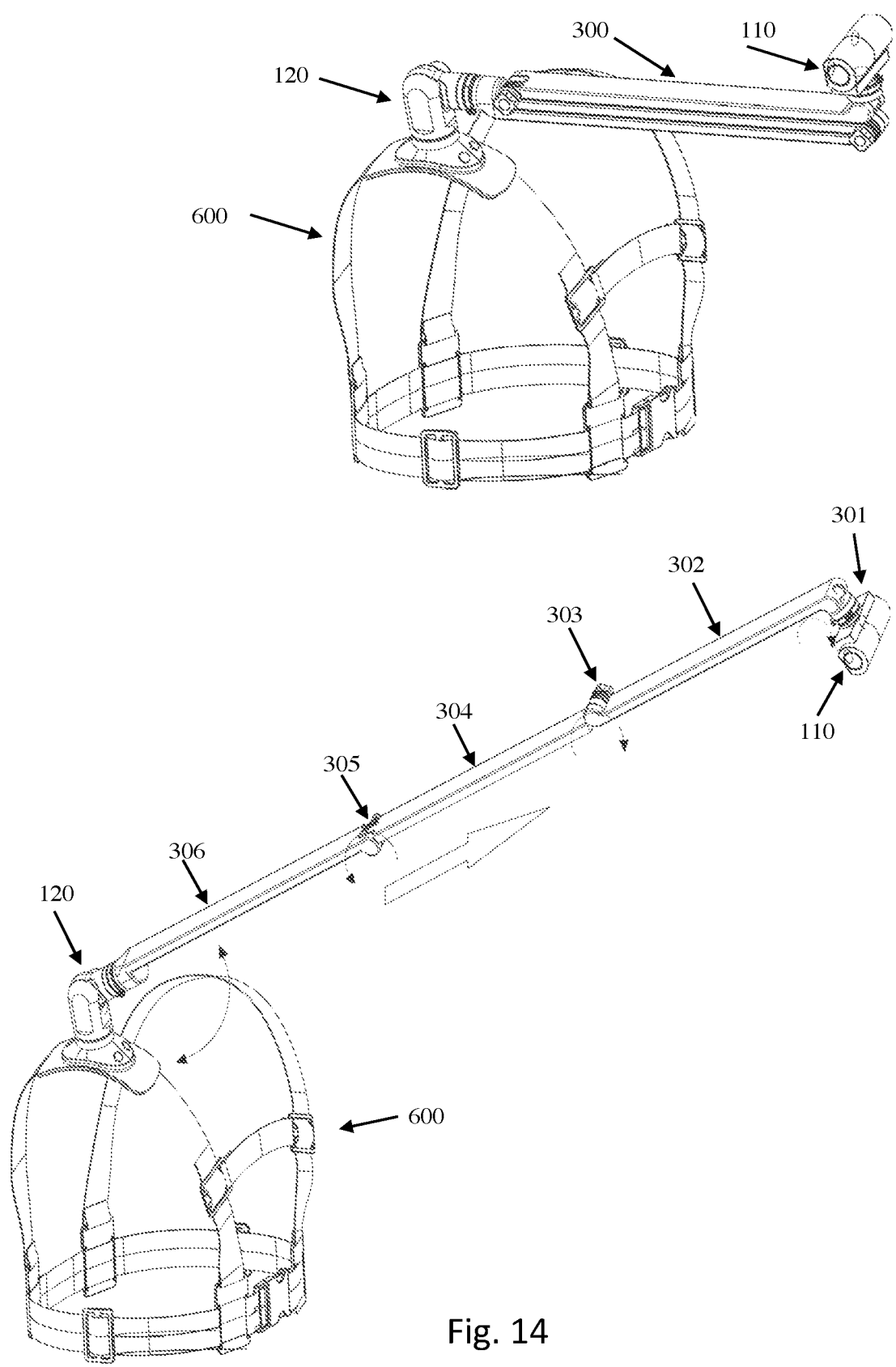
FIG. 14 illustrates inclusion of a foldable extension into the modular action camera system with chest harness of FIG. 10.
Figure 15:
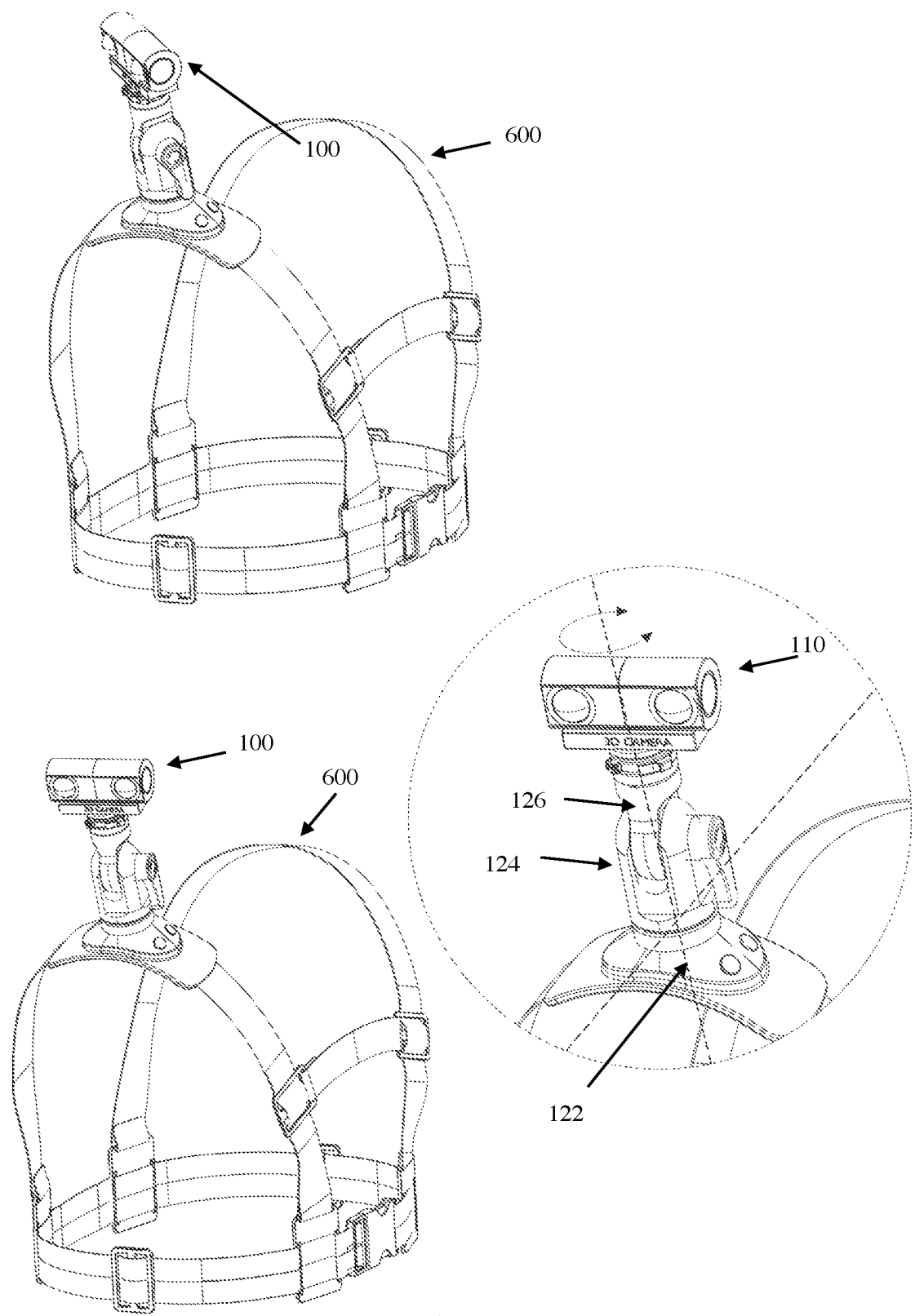
FIG. 15 illustrates horizontal rotation of the modular action camera system with chest harness of FIG. 10.
Figure 16:
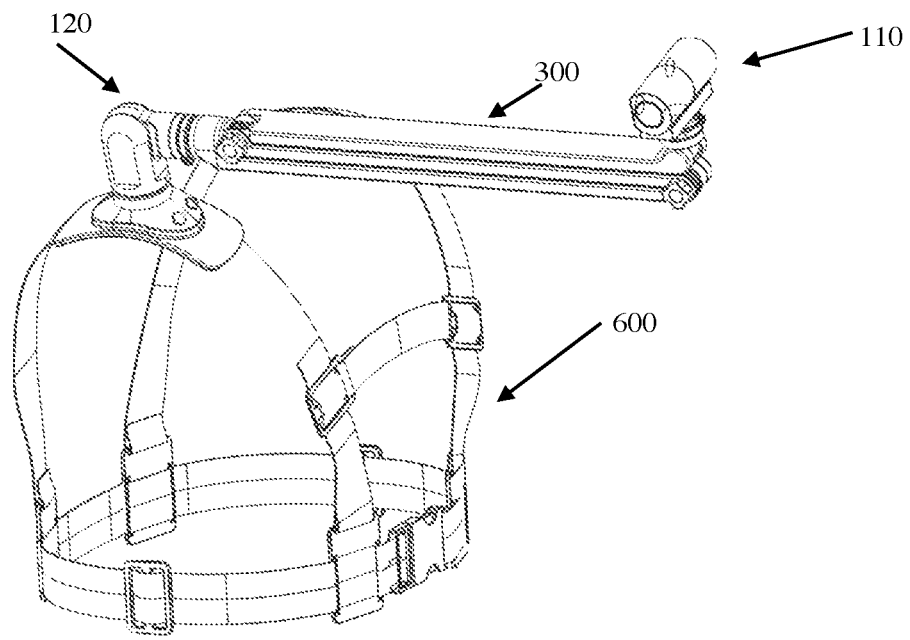
FIG. 16 illustrates rotation of the foldable extension and the modular action camera system with chest harness of FIG. 10.
Figure 16:
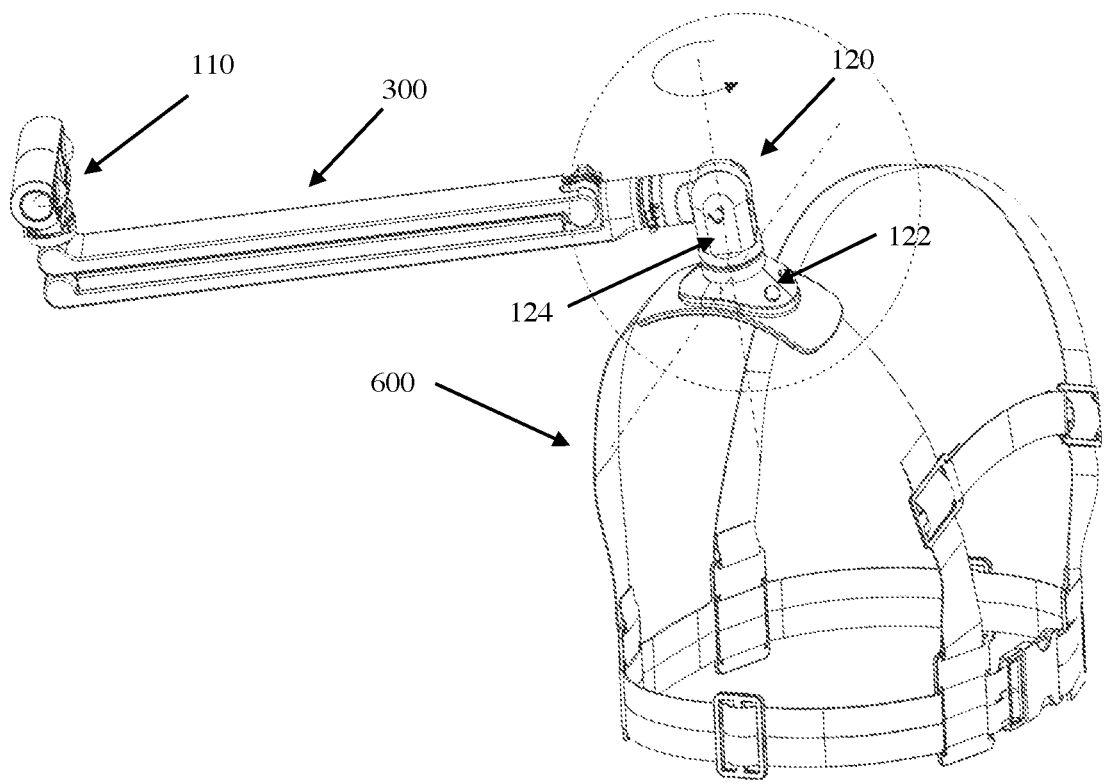
Figure 17:
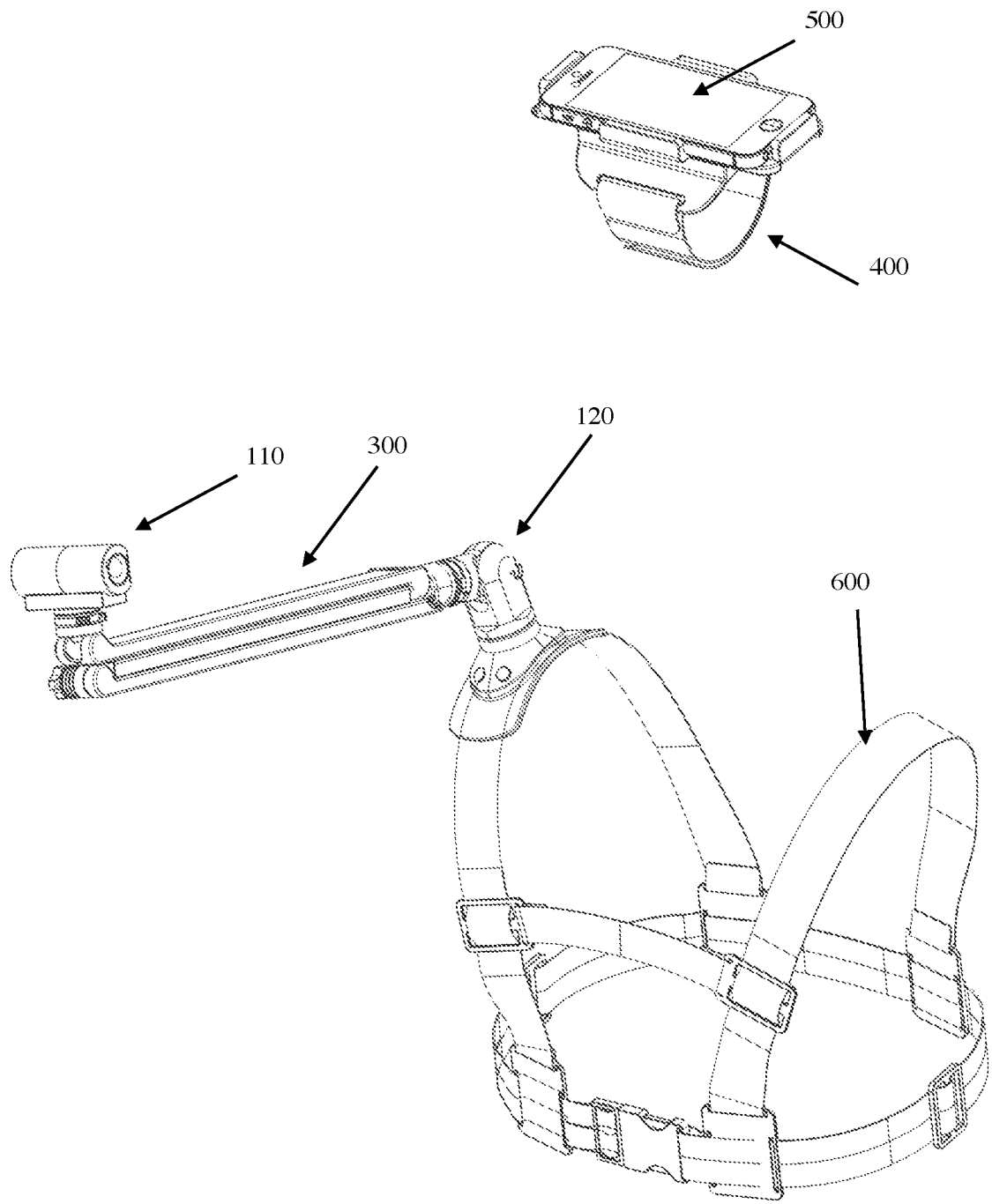
FIG. 17 illustrates the modular action camera system with chest harness of FIG. 10 along with a smartphone armband.
Figure 18:
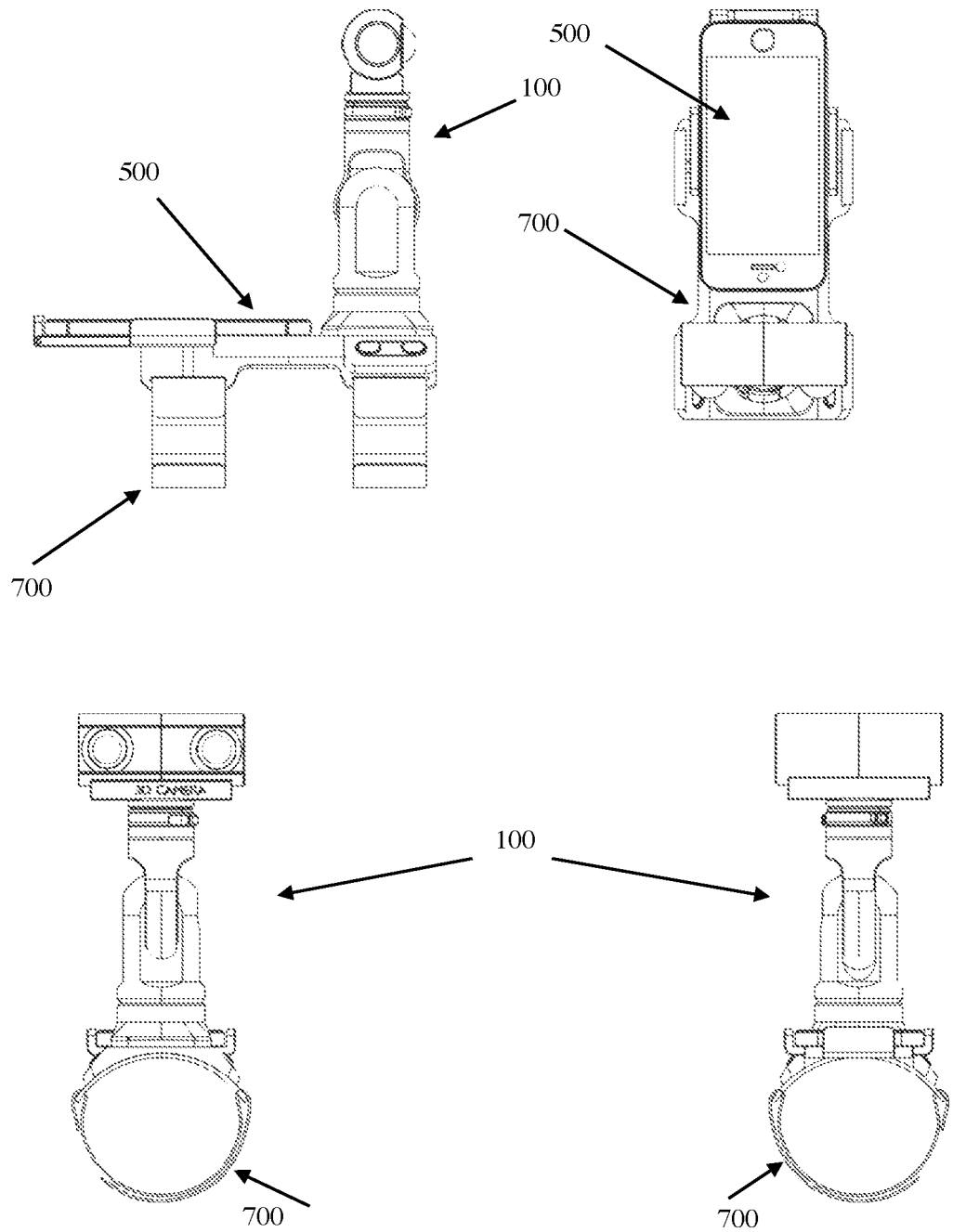
FIG. 18 illustrates a modular action camera system with armband according to an embodiment of the invention.

FIGS. 10-12 illustrate the modular action camera system 100 coupled to a chest harness 600 according to an embodiment of the invention. The chest harness 600 can be any type of chest harness, the identification and implementation of which is apparent to one of ordinary skill in the art. In an exemplary embodiment of the invention, the action camera system 100 is coupled to a shoulder strap of the chest harness 600 as shown. FIG. 13 illustrates rotation of the camera about the body 124. FIG. 14 illustrates inclusion of the folding extension 300 between the camera 110 and mount 120 in a folded position (top diagram) and in an extended position (bottom diagram). FIG. 15 illustrates rotation of the camera 110 about its vertical axis without the folding extension 300. FIG. 16 illustrates rotation of the camera 110 about its vertical axis with the folding extension 300. FIG. 17 illustrates inclusion of the armband 400 and smartphone 500 for operating the camera 110.

Figure 19:
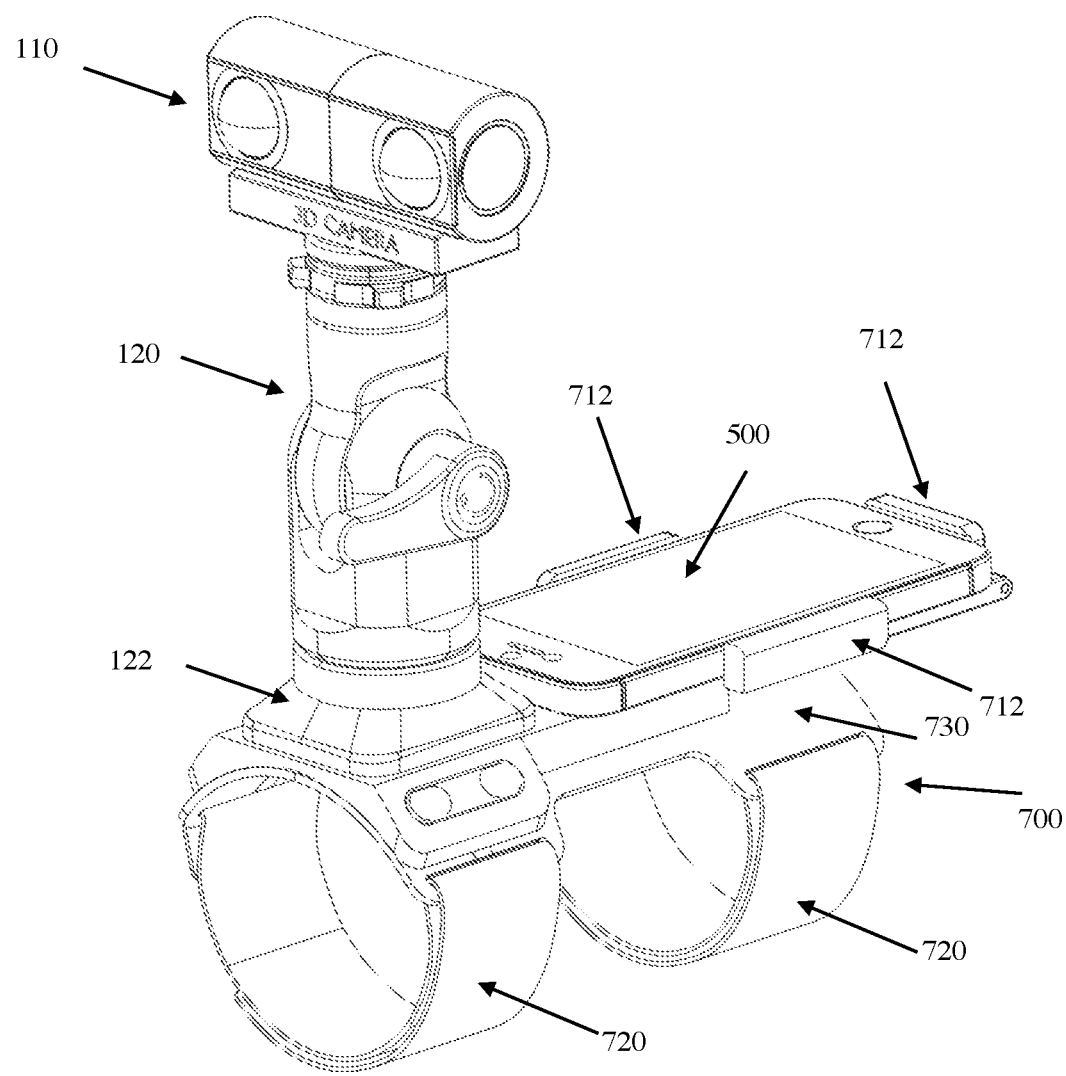
FIG. 19 illustrates a closeup view of the modular action camera system with armband of FIG. 18.
Figure 20:
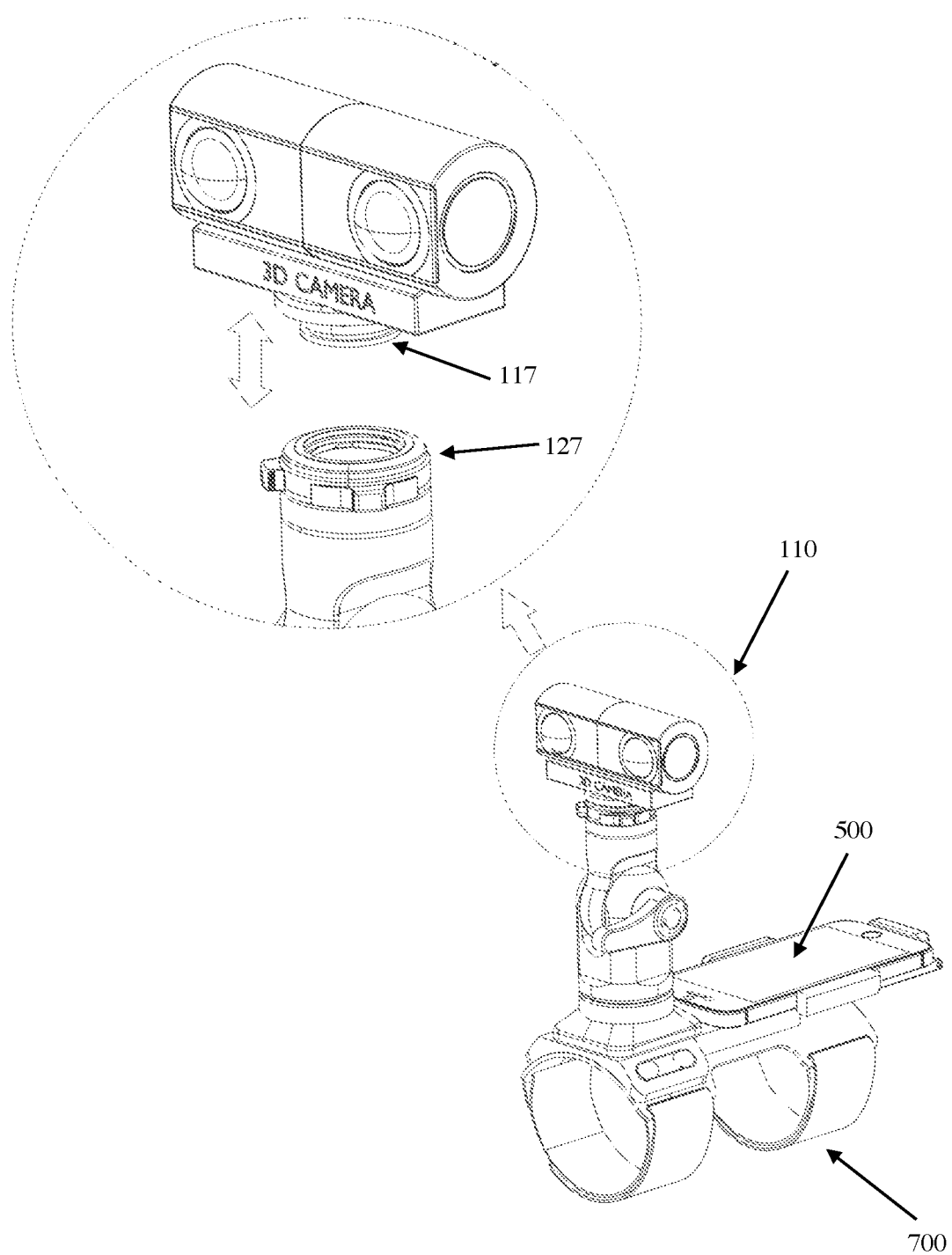
FIG. 20 illustrates separation of the modular action camera system with armband of FIG. 18.

FIGS. 18-26 illustrate a modular action camera system comprising an armband mount 700 according to an embodiment of the invention. The armband mount 700 is configured to secure a smartphone 500 and an action camera system 100 to a user's wrist/arm. Referring to FIG. 19, the armband mount 700 comprises flexible straps 720 coupled to an arm plate 730. The base 122 of the mount 120 is secured to the arm plate 730. The armband mount 700 comprises guides 712 (identical to guides 412) at each edge of a face 710 (blocked from view in FIG. 19) for securing the smartphone 500. The position of the guides 712 can be varied to receive and lock into place different sized smartphones 500. Referring to FIG. 20, the camera 110 includes a male connector 117 configured to be received by a female connector 127 on the mount 120. Upon release of the female connector 127, the male connector 117 is released and the camera 110 is detached from the mount 120.

Figure 21:
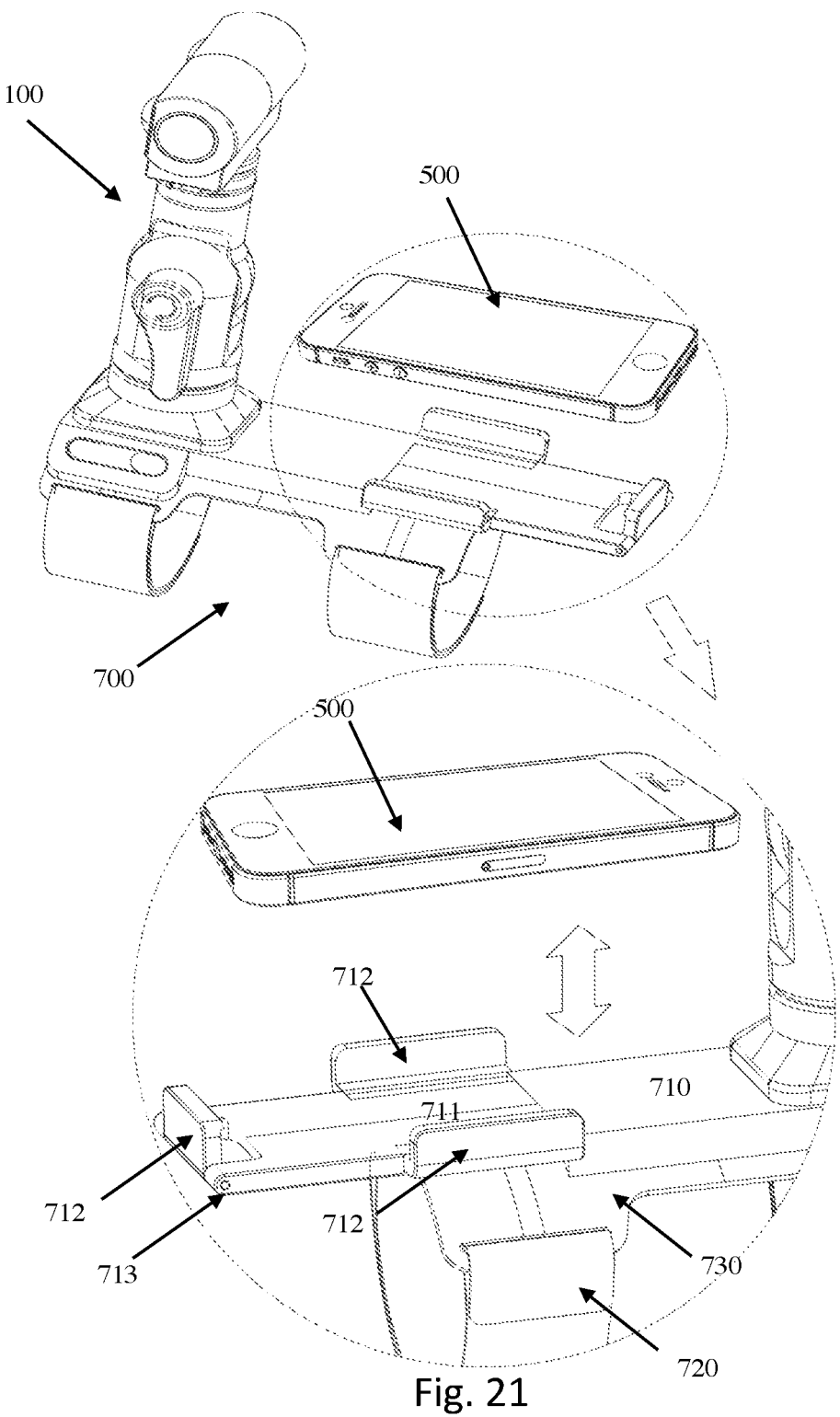
FIG. 21 illustrates inclusion of a smartphone into the modular action camera system with armband of FIG. 18.
Figure 22:
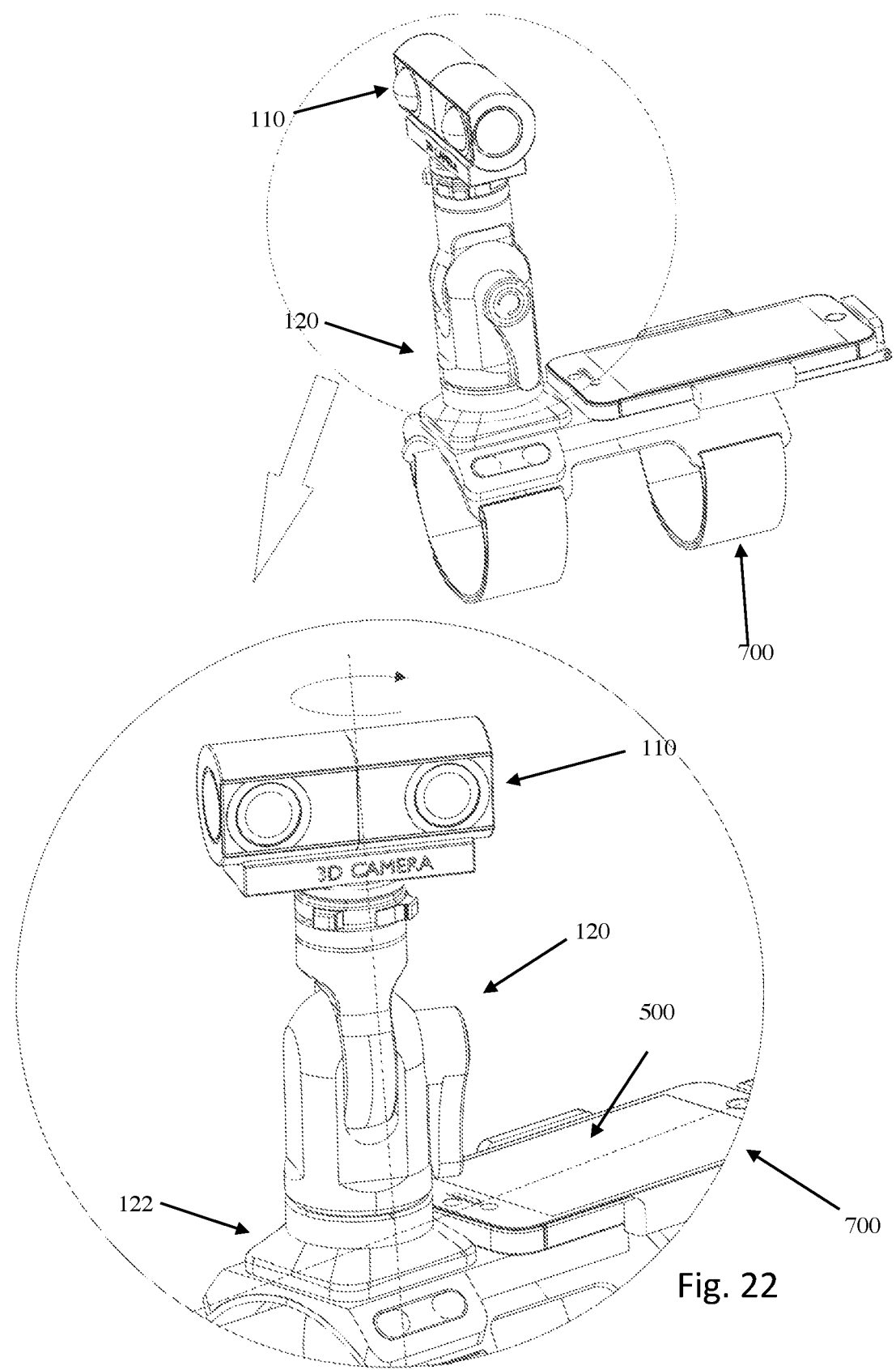
FIG. 22 illustrates horizontal rotation of the modular action camera system with armband of FIG. 18.
Figure 23:
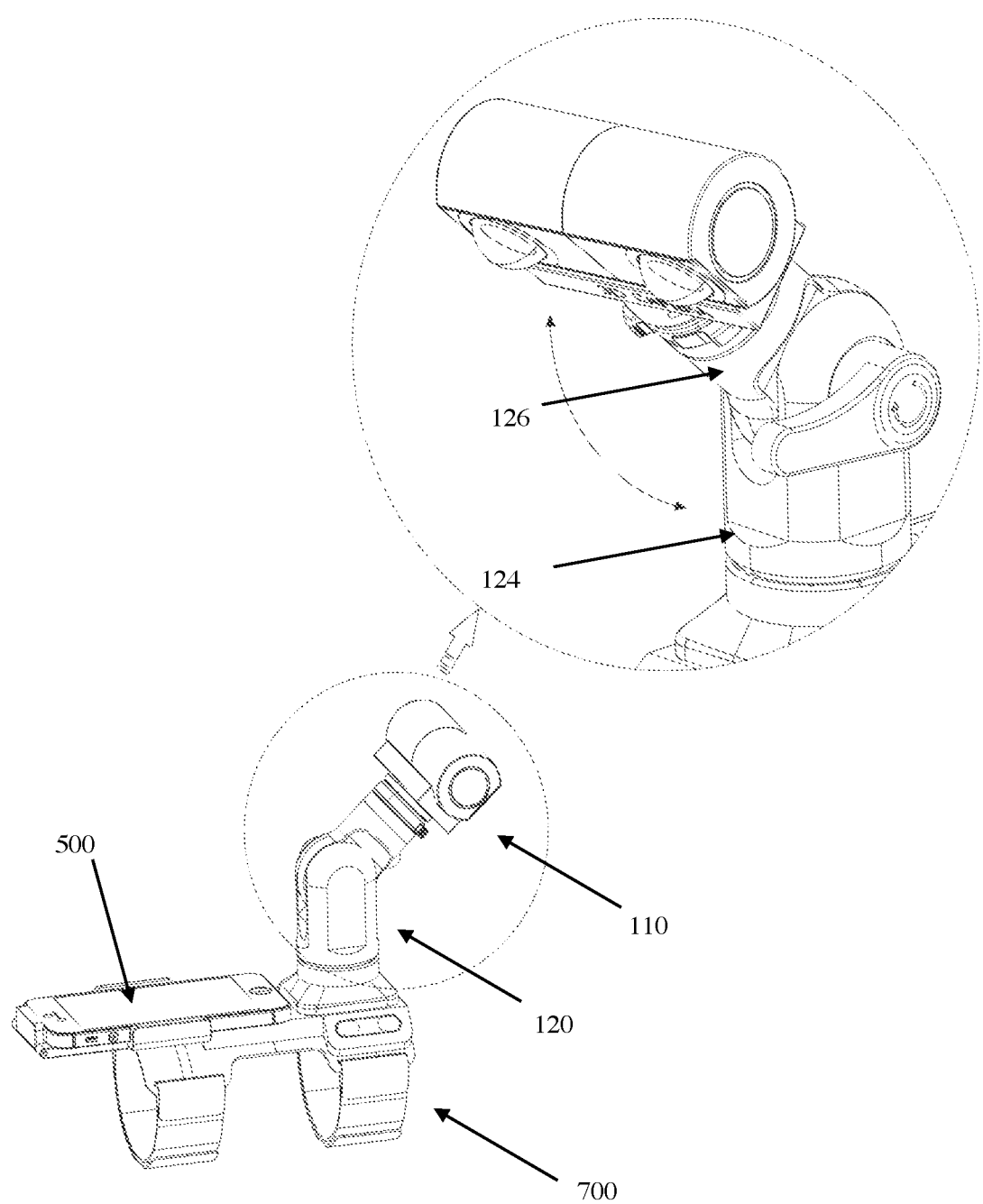
FIG. 23 illustrates vertical rotation of the modular action camera system with armband of FIG. 18.

FIG. 21 illustrates the face 710 on the arm plate 730. Here, the face 710 comprises an adjustable tongue 711 to accommodate different sized smartphones 500. A distal guide 712 pivots about a rod 713 to secure the smartphone into place after insertion. FIG. 22 illustrates rotation of the camera 110 about its vertical axis. FIG. 23 illustrates rotation of the camera 110 with in a vertical plane.

Figure 24:
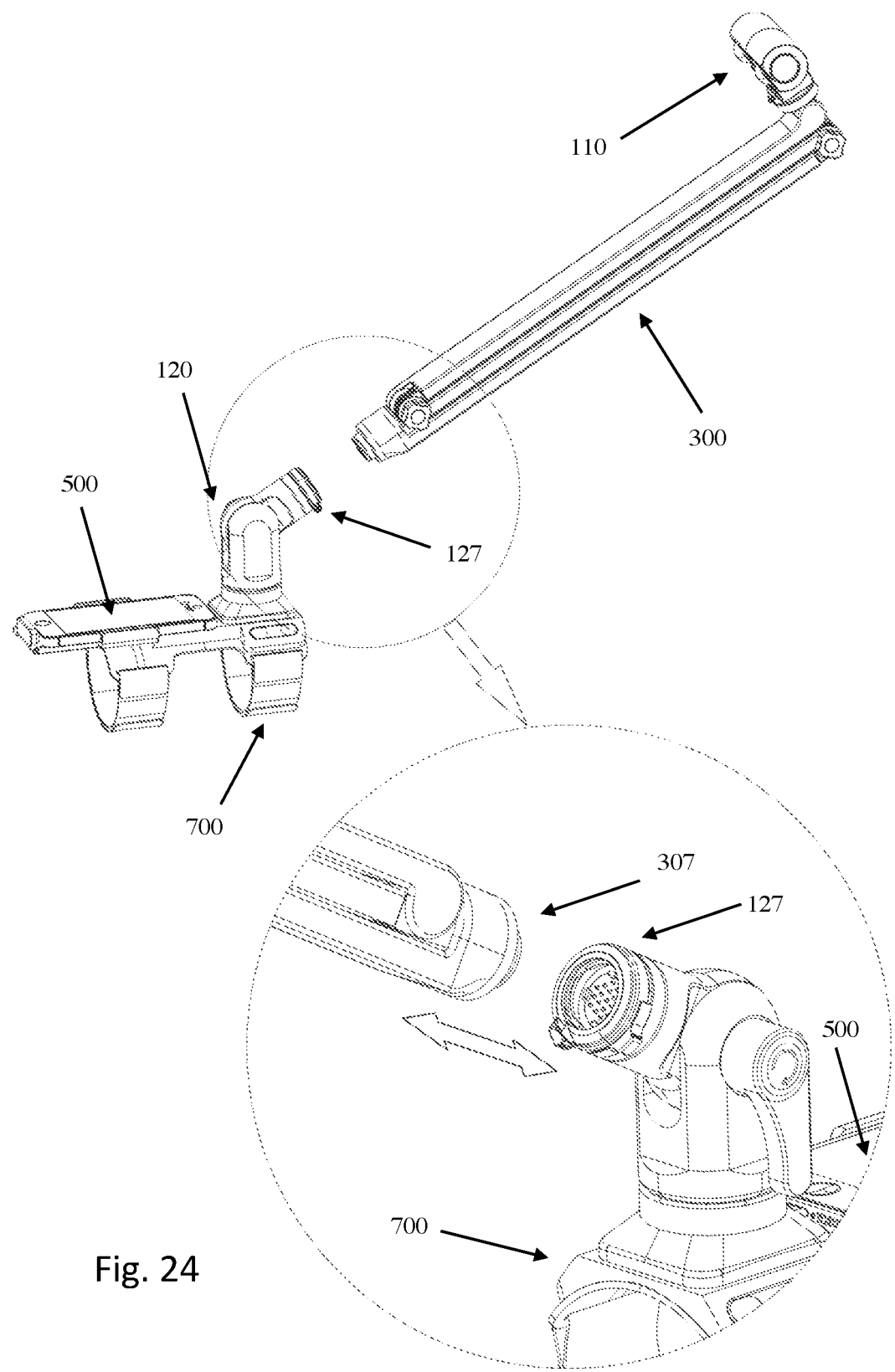
FIG. 24 illustrates inclusion of a foldable extension into the modular action camera system with armband of FIG. 18.
Figure 25:
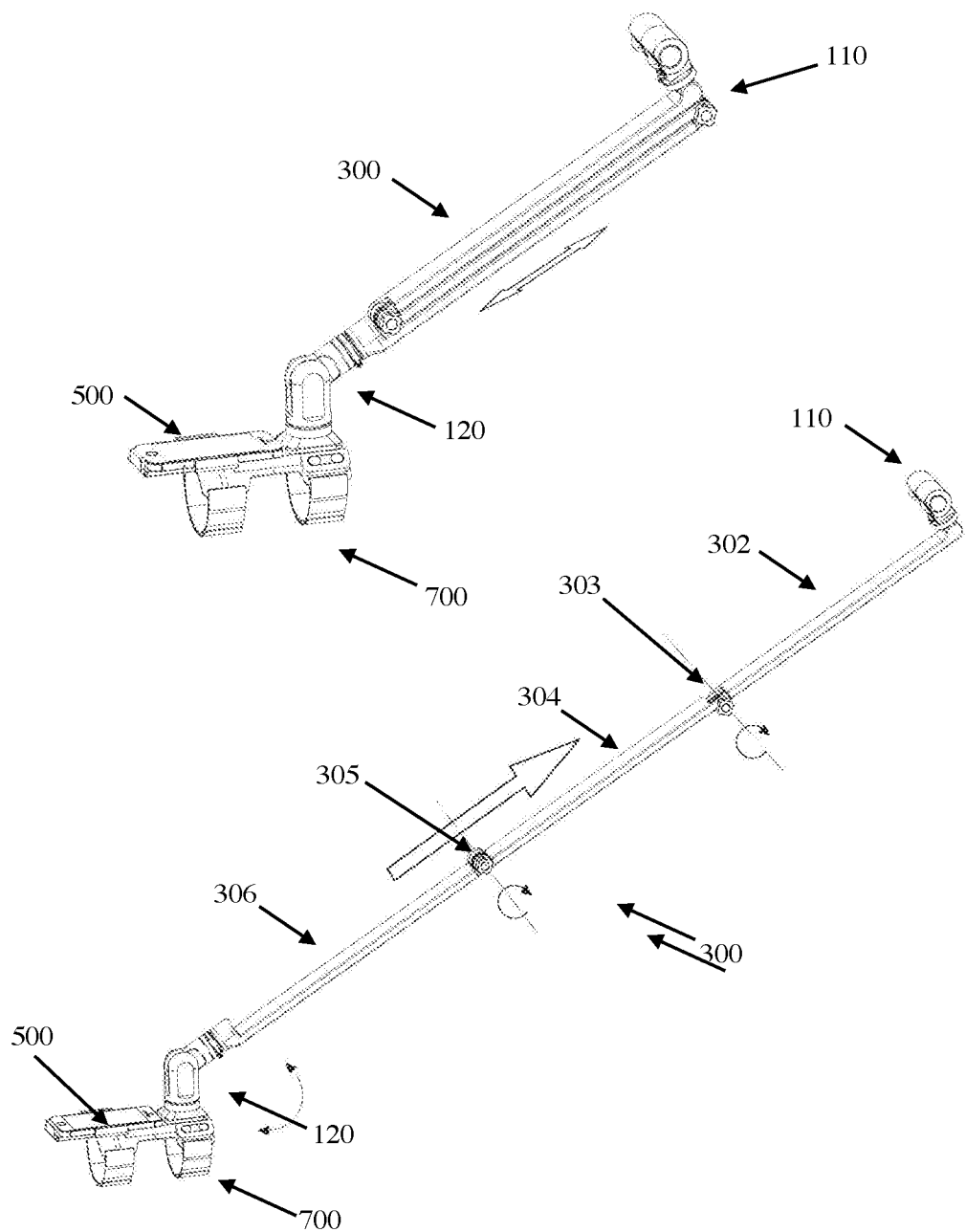
FIG. 25 illustrates expansion of the foldable extension shown in FIG. 24.

FIG. 24 illustrates the armband mount 700 with the folding extension 300 coupled to the camera 110. The male connector 307 (identical to male connector 117) is attached to the female connector 127 of the mount 120. At the other end, the folding extension 300 comprises a female connector 317 (identical to female connector 127) to attach the folding extension 300 to the male connector 117 of the camera 110. FIG. 25 illustrates inclusion of the folding extension 300 between the camera 110 and mount 120 in a folded position (top diagram) and in an extended position (bottom diagram).

Figure 26:
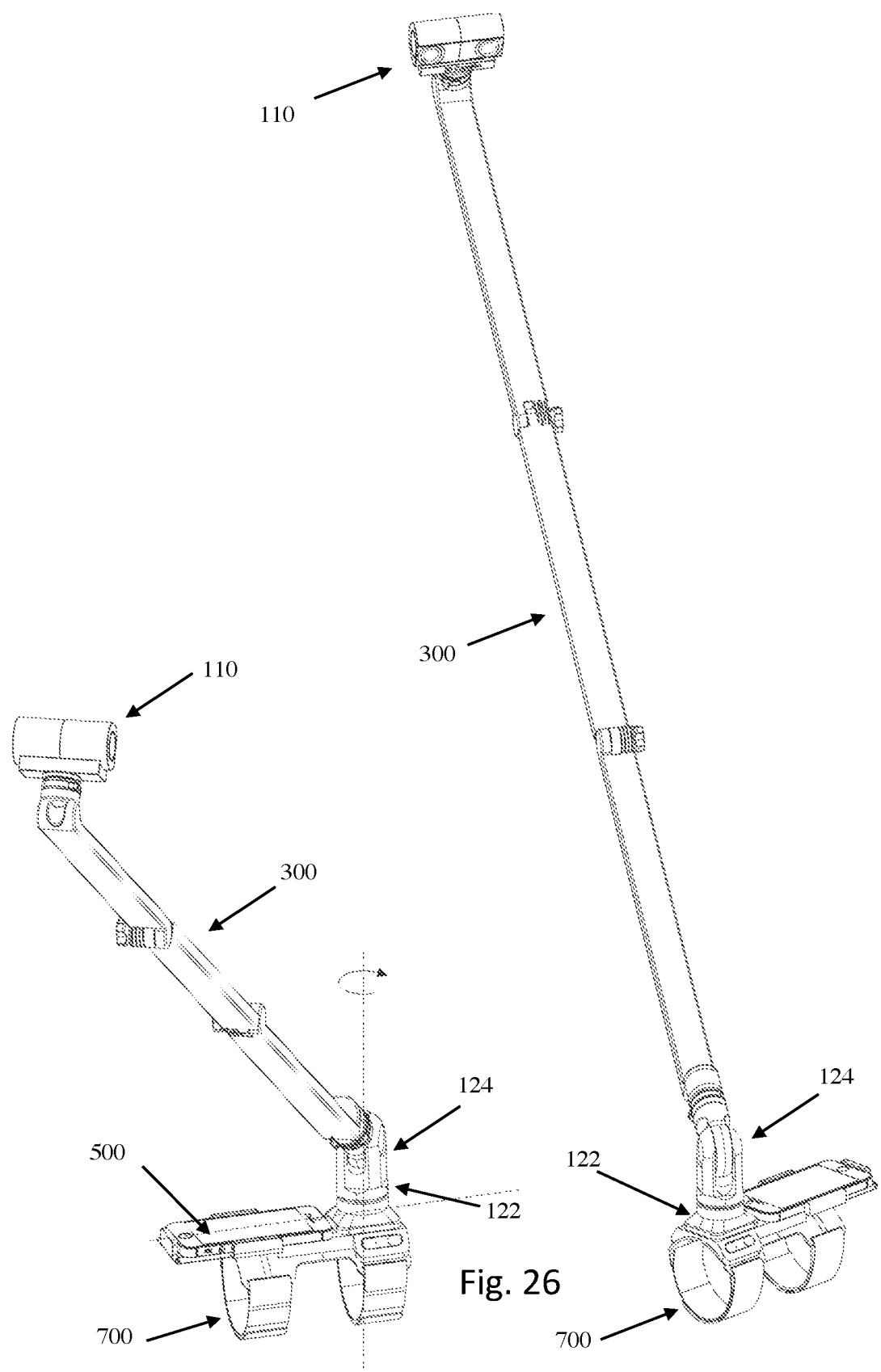
FIG. 26 illustrates rotation of the foldable extension shown in FIG. 25.
Figure 27:
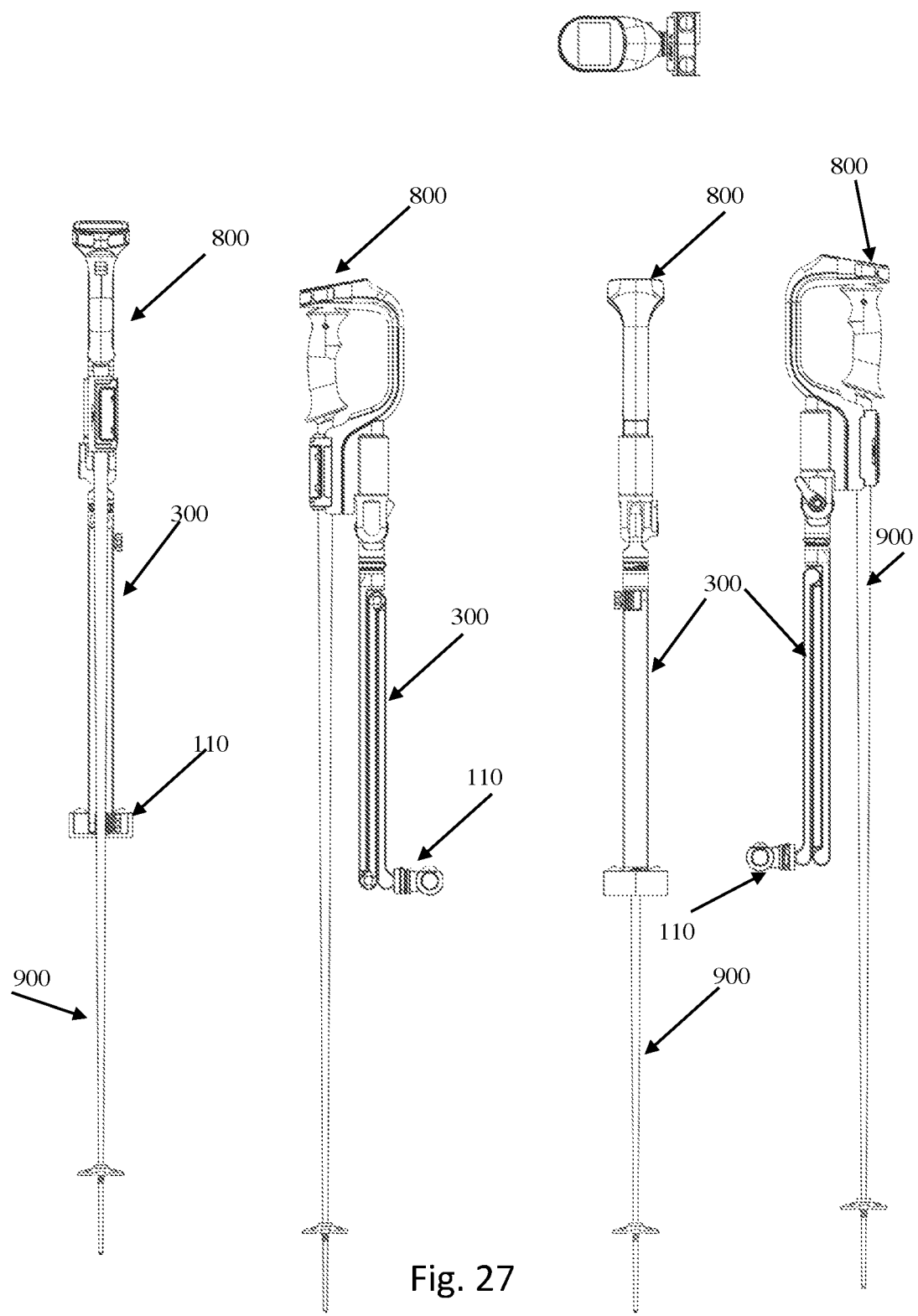
FIG. 27 illustrate a modular action camera system with ski pole according to an embodiment of the invention.

FIG. 26 illustrates rotation of the camera 110 around the vertical axis of the mount 120.

Figure 28:
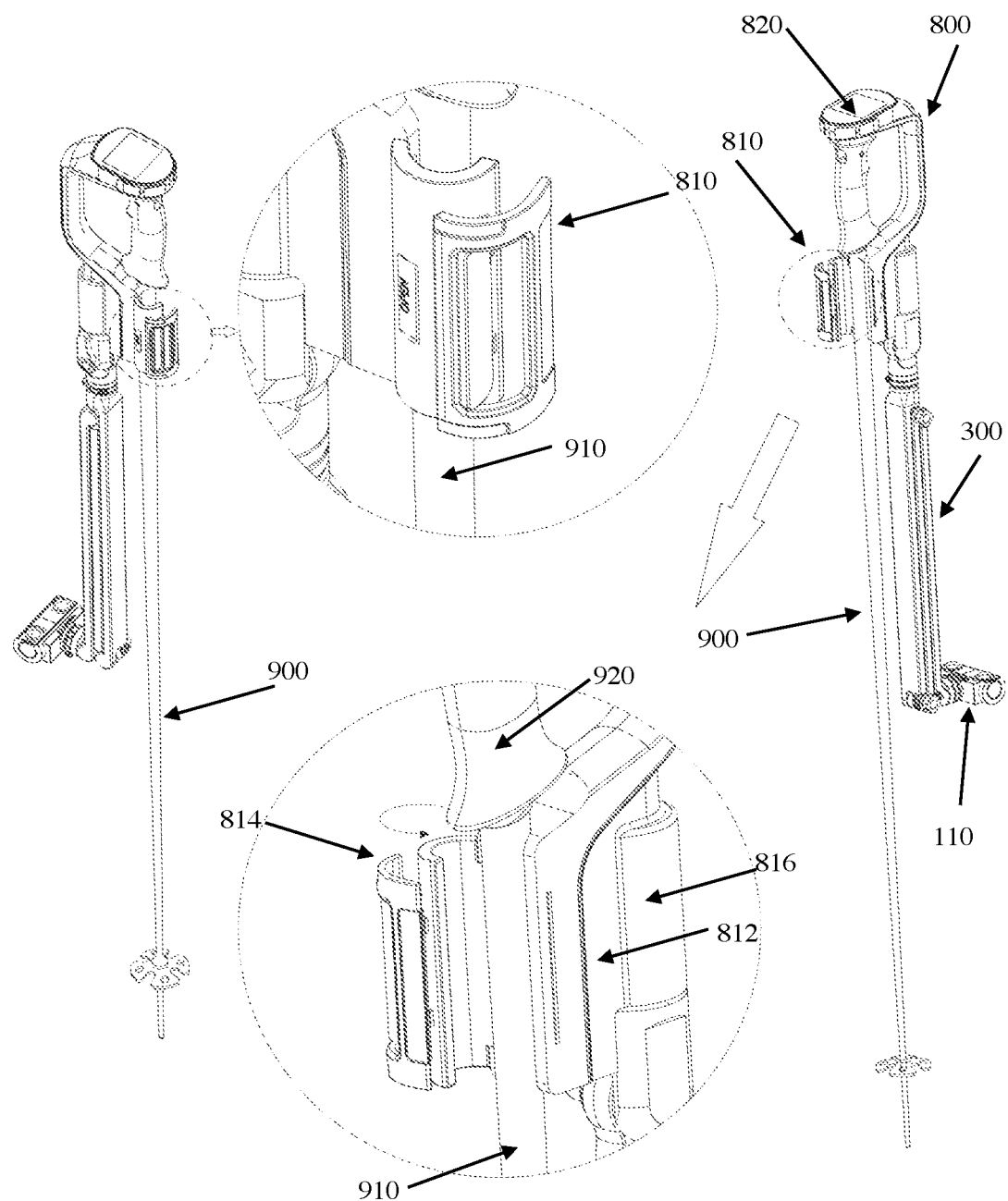
FIG. 28 illustrates inclusion of a foldable extension into the modular action camera system with ski pole of FIG. 27.
Figure 29:
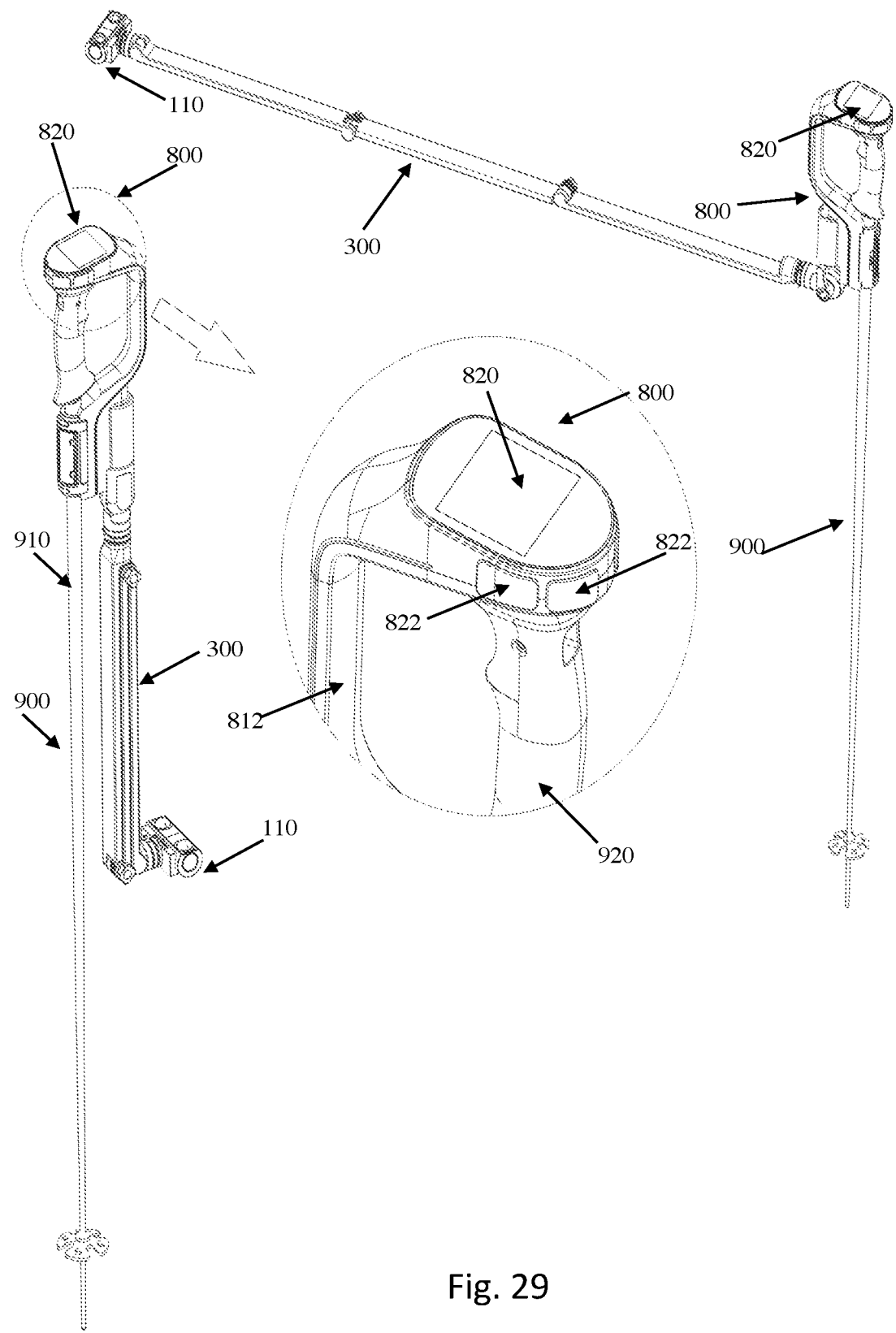
FIG. 29 illustrates expansion of the foldable extension shown in FIG. 28.
Figure 30:
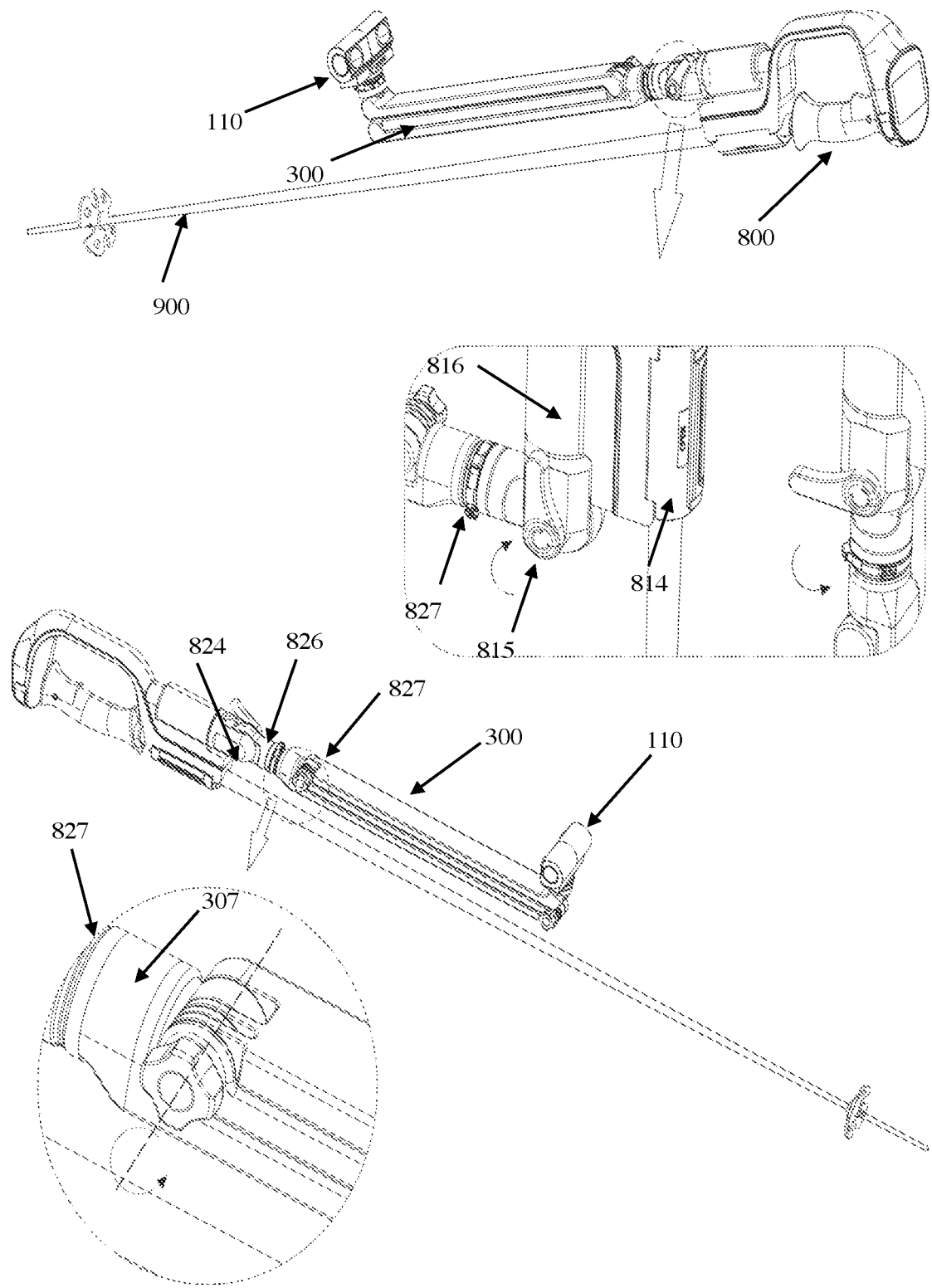
FIG. 30 illustrates collapse of the foldable extension shown in FIG. 28.
Figure 31:
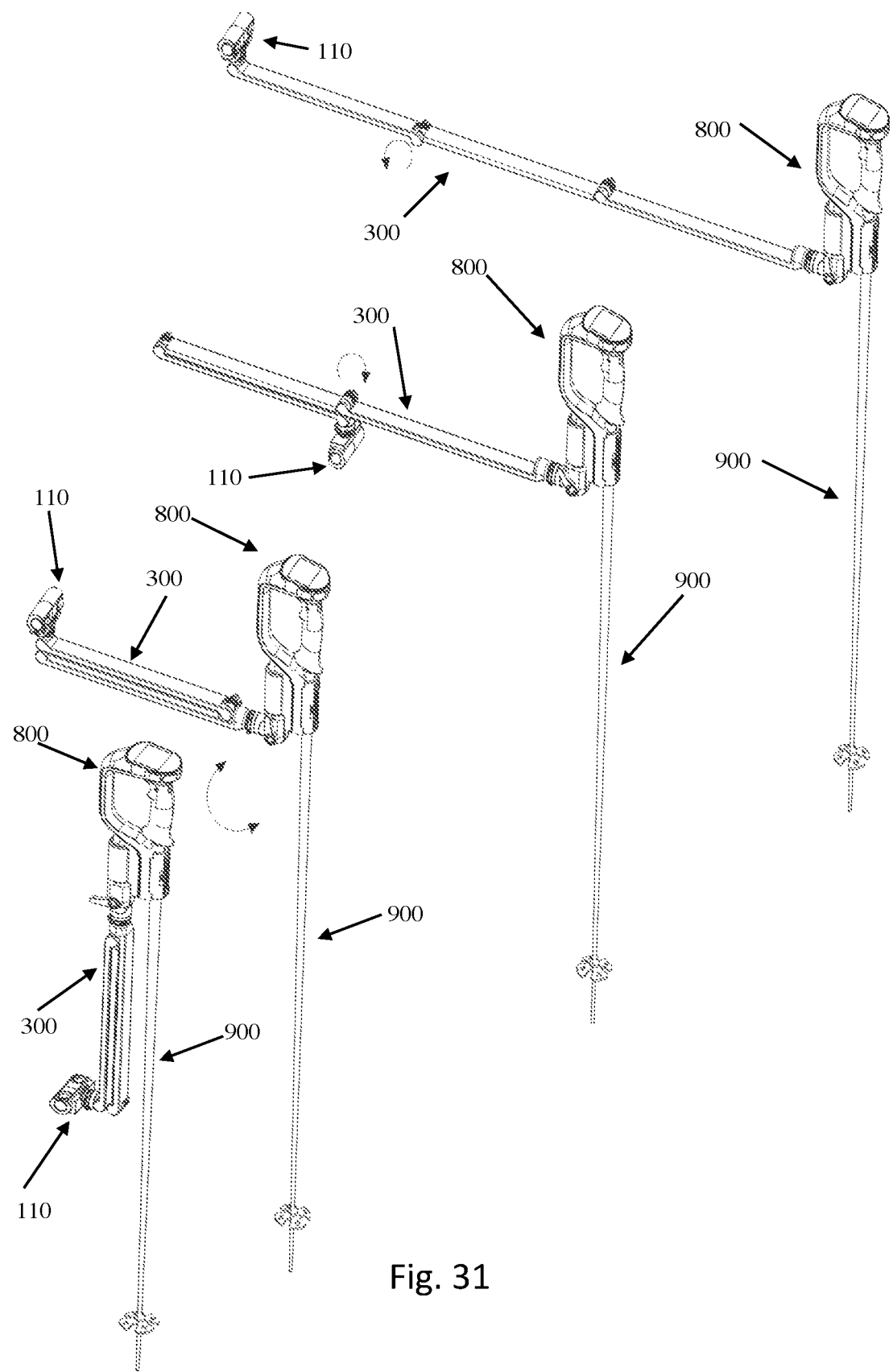
FIG. 31 illustrates various positions of the foldable extension shown in FIG. 28.
Figure 32:
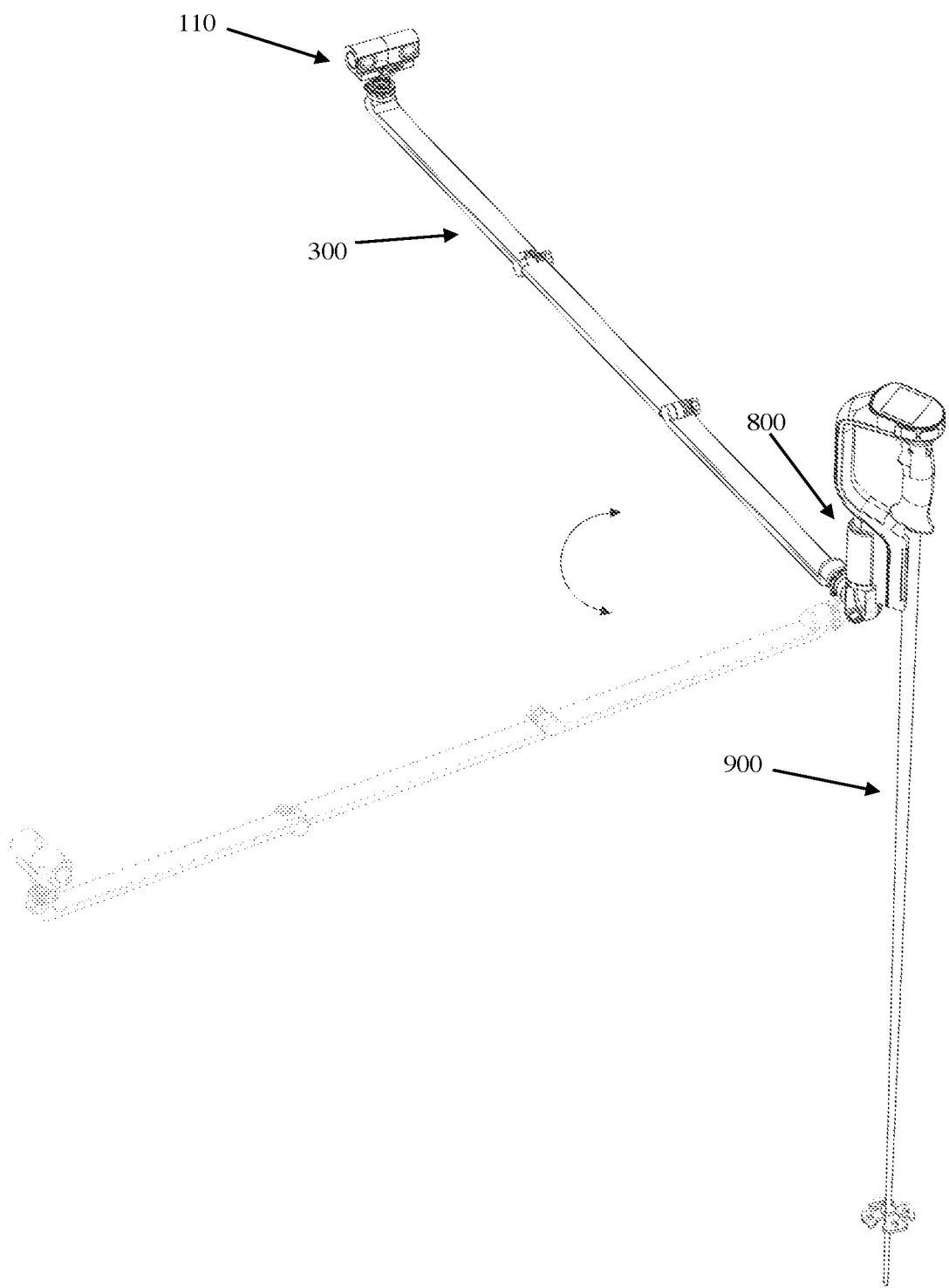
FIG. 32 illustrates horizontal rotation of the foldable extension shown in FIG. 28.
Figure 33:
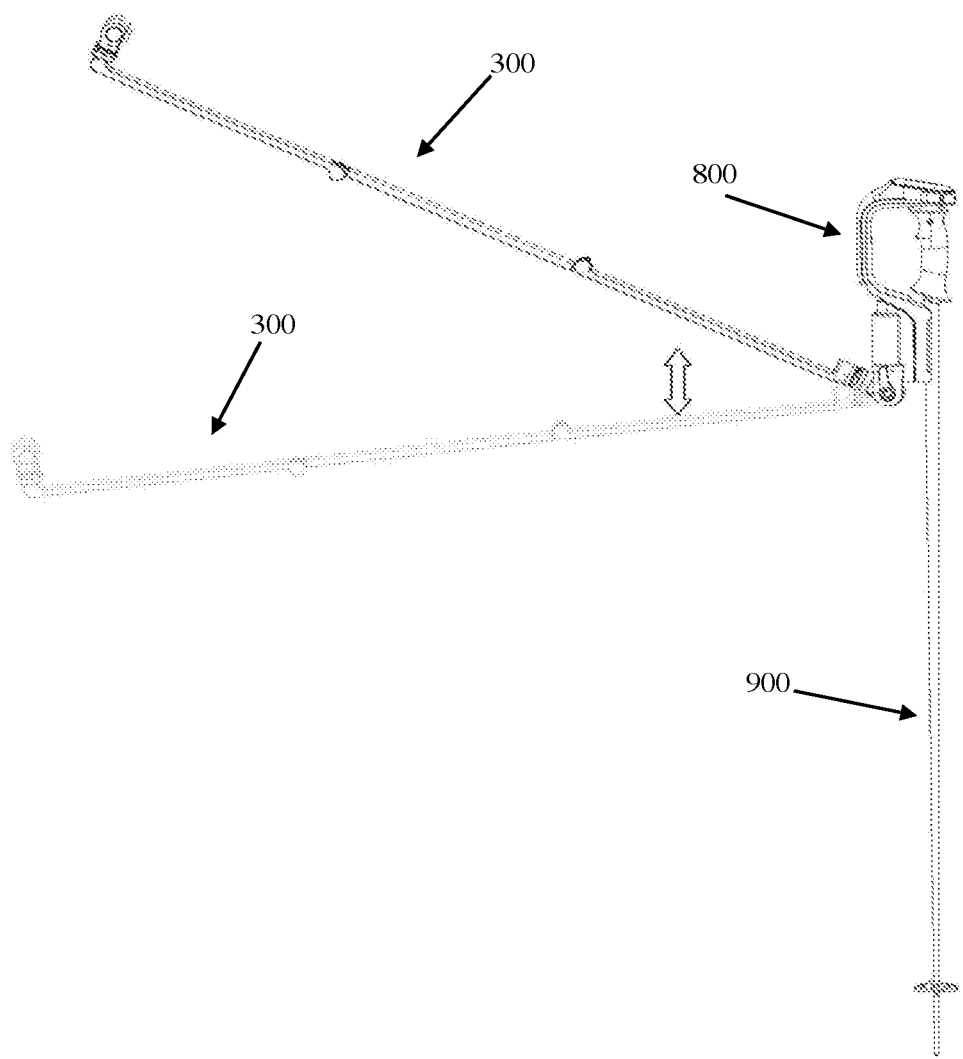
FIG. 33 illustrates vertical rotation of the foldable extension shown in FIG. 28.
Figure 34:
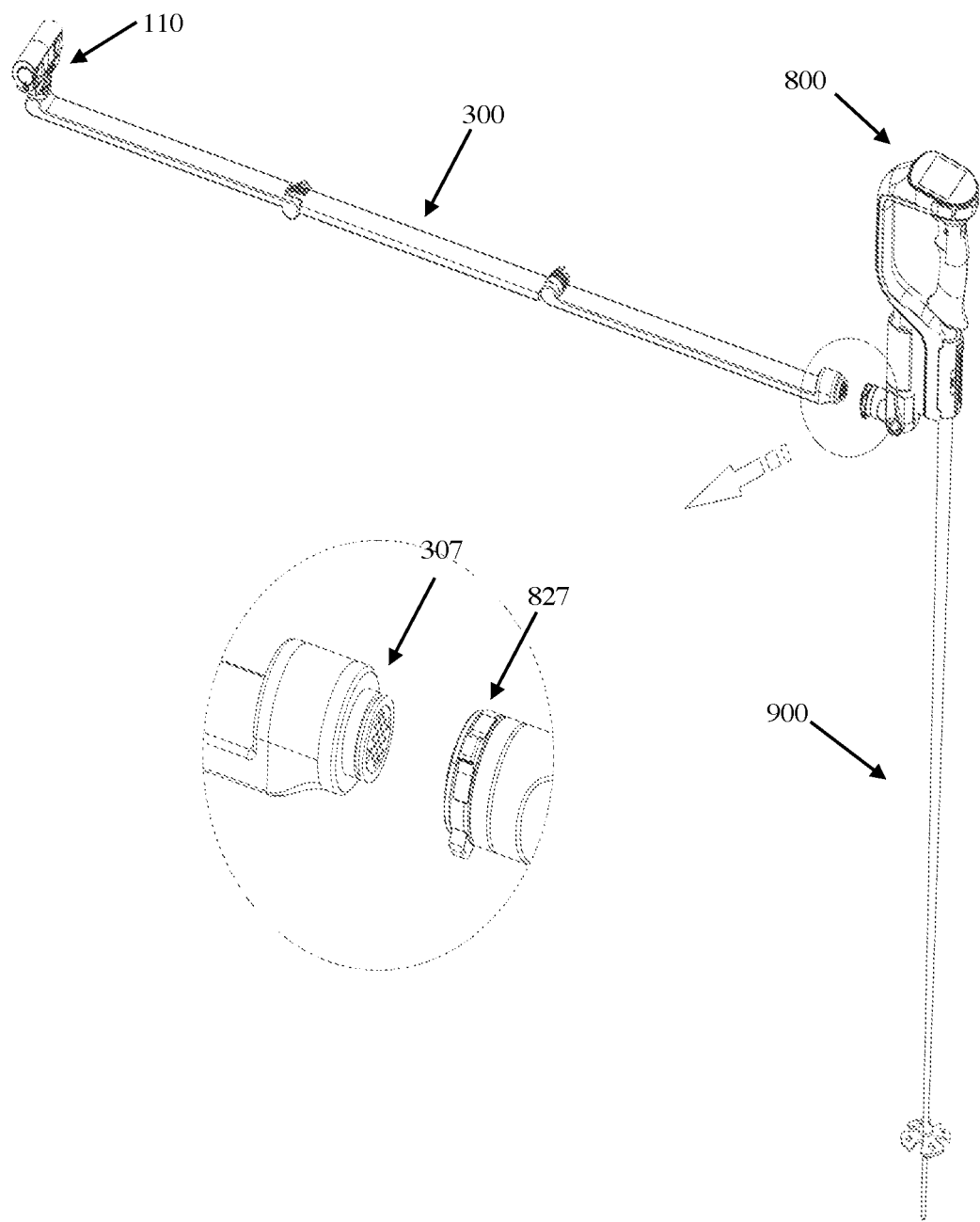
FIG. 34 illustrates separation of the foldable extension from the modular action camera system with ski pole of FIG. 27.
Figure 35:
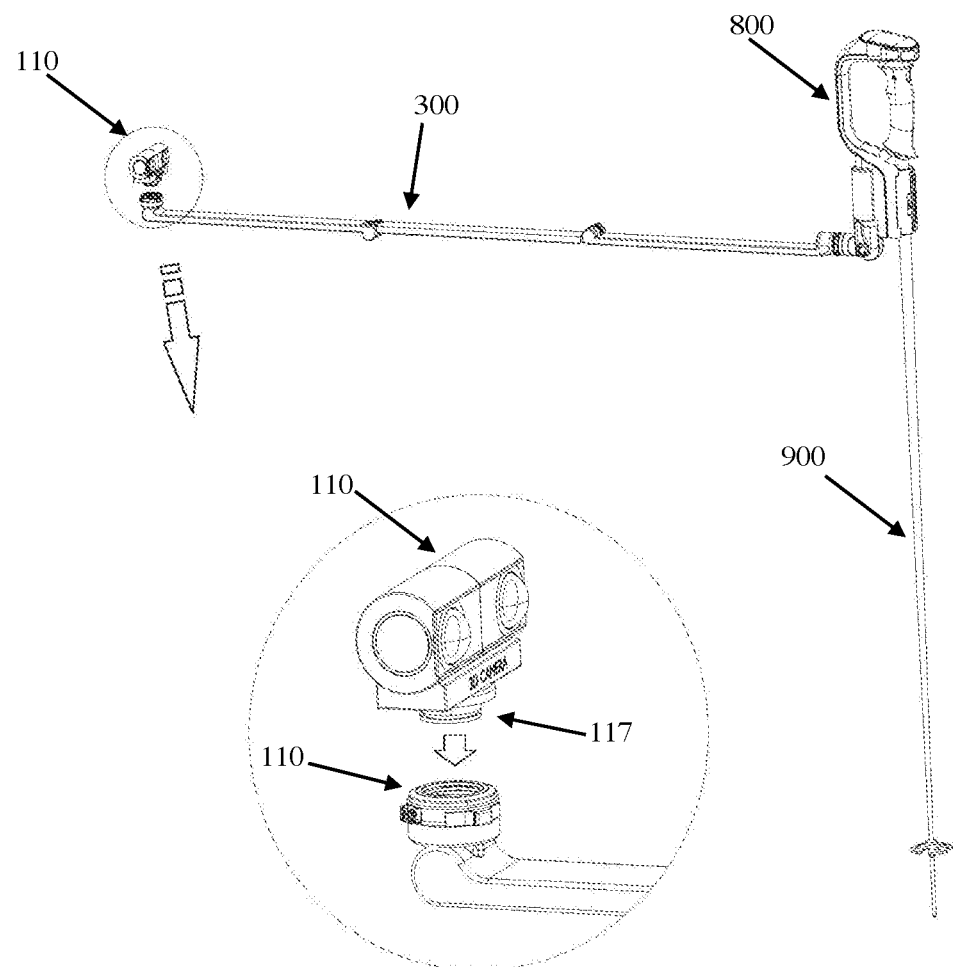
FIG. 35 illustrates separation of an action camera from the foldable extension shown in FIG. 28.
Figure 36:
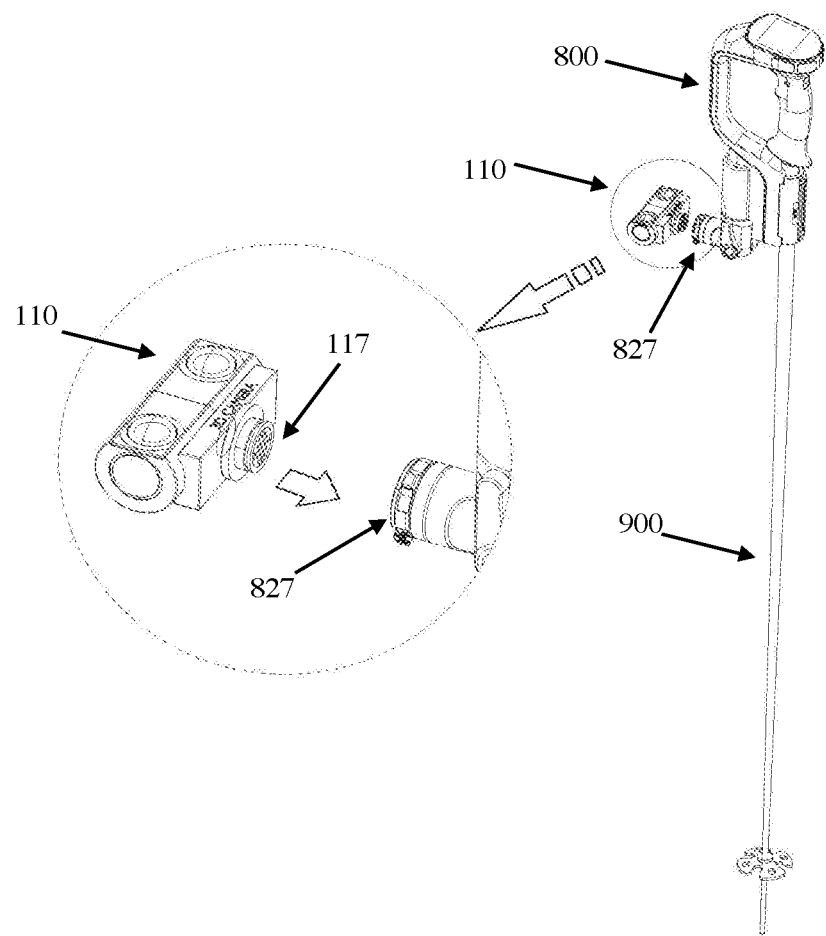
FIG. 36 illustrates separation of the modular action camera system with ski pole of FIG. 27.

FIGS. 27-38 illustrate a modular action camera system comprising a ski pole mount 800 according to an embodiment of the invention. Here, the ski pole mount 800 is coupled to a ski pole 900. Referring to FIG. 28, the ski pole mount 800 includes an adapter 810 comprising sleeve 812, which is configured to encircle a pole 910 underneath of a handle 920 of a ski pole 900. The sleeve 812 detachably couples to a base 812 as shown. Referring to FIG. 29, the ski pole mount 800 further comprises a computer (not shown), a display 820, and a plurality of buttons 922 to interact with a camera app (not shown) executed on the computer. Interaction can be further facilitated through the display 820; i.e., the display may be a touchscreen display. The camera app controls the camera 110 remotely via a wireless communications link as described above. In an alternative embodiment, a user smartphone 500 can be substituted for the computer, display 820, and plurality of buttons 822. For example, the ski pole mount 800 can be configured to receive a smartphone 500 similar to that as shown in FIG. 9. Referring to FIG. 30, the ski pole mount 800 comprises a base 824, which houses an internal battery (not shown) to power the camera 110. The optional extension 300 can be coupled to the base 824 via a female connector 827 at support 826. The support 826 may be released and moved relative to the base 824 via a handle 815. Referring to FIG. 31, the optional extension 300 is shown in four different positions: fully extended (top view); partially extended (first view under top view); folded, but positioned horizontally (second view under top view); and folded, but position vertically (bottom view). FIGS. 31 and 32 illustrate rotation of the extension 300 and camera 110 within a vertical plane. FIG. 33 illustrates release of the optional extension 300 from the ski mount 800. FIG. 34 illustrates release of the camera 110 from the optional extension. FIG. 35 illustrates connection of the camera 110 to the ski mount 800.

Figure 37:
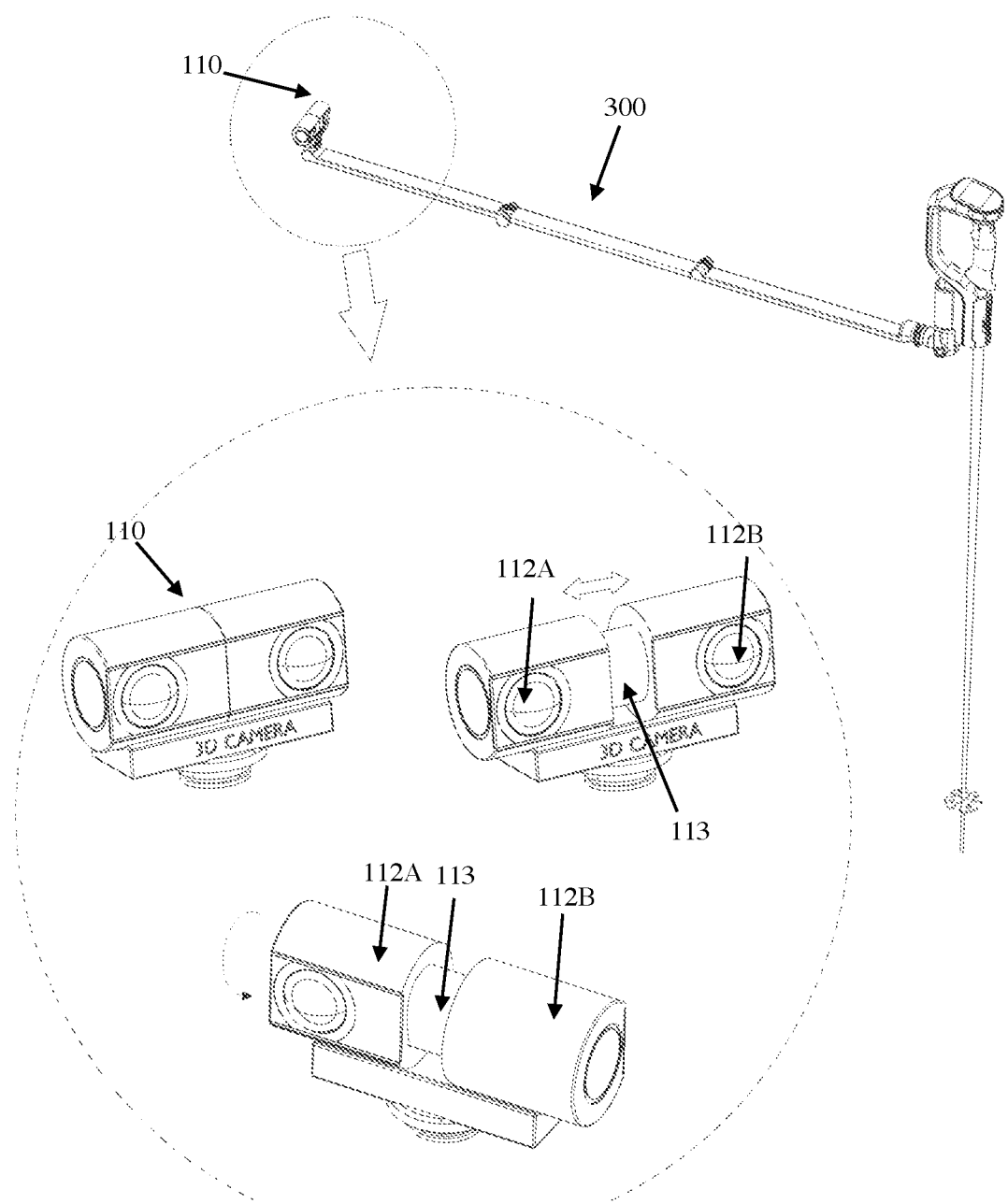
FIG. 37 illustrates rotation of the lenses in the modular action camera system with ski pole of FIG. 27.
Figure 38:
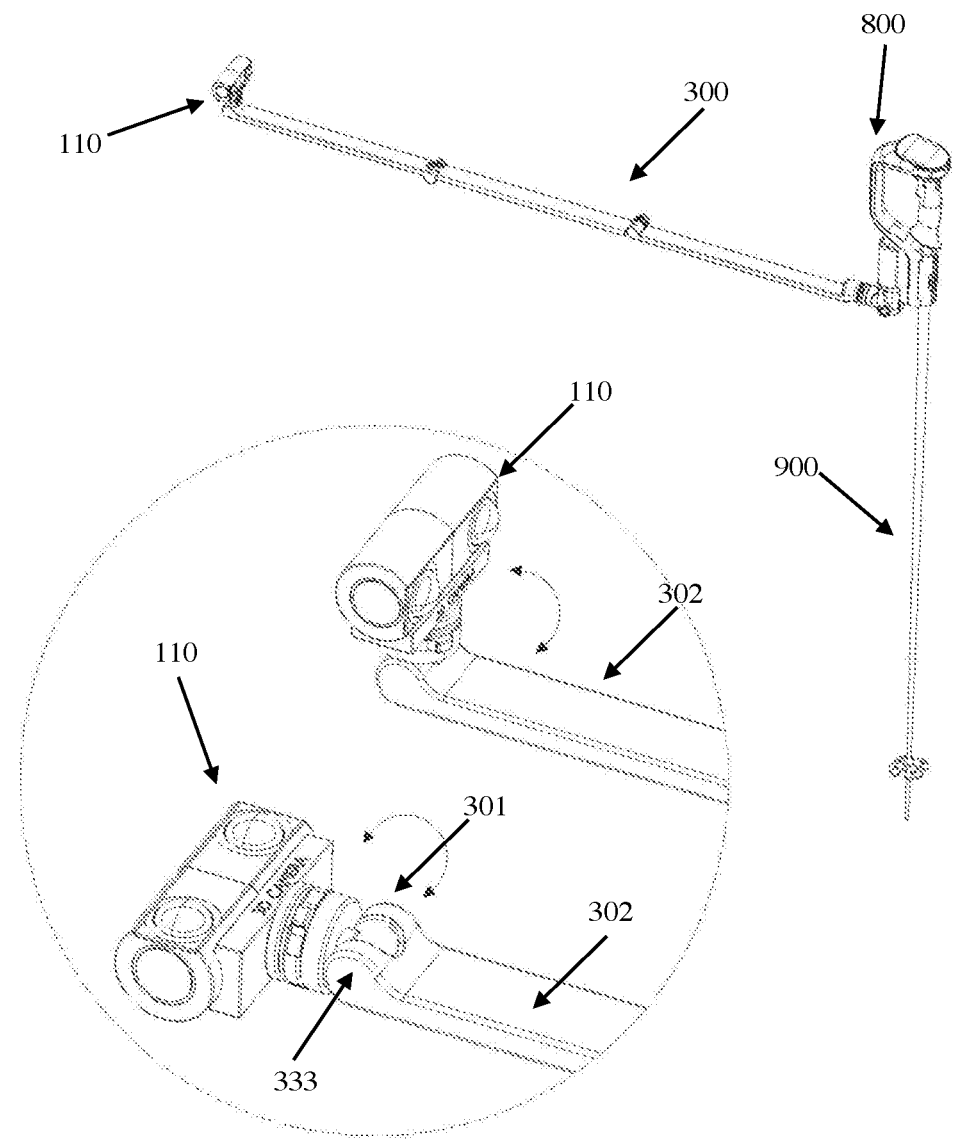
FIG. 38 illustrates rotation of an action camera in the modular action camera system with ski pole of FIG. 27.

FIG. 37 illustrates rotation of the of the lenses 112A and 112B about a cylindrical support 113. Here the lenses 112A and 112B can be separated and/or rotated relative to one another. For example, as shown in the bottom diagram, the lens 112A can be positioned to capture video 180 degrees relative to the video captured by lens 112B. In other words, the lens 112A is forward looking while the lens 112B is rearward looking. FIG. 38 illustrates rotation of the camera 110 about joint 333.

Accordingly, the modular action camera systems as described above can be configured in numerous ways to capture various action scenes perspectives.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. An action camera system comprising:
   a camera,
   a mount configured to detachably couple the camera, the mount comprising a battery, a base, a body, and a vertical support;
   a folding extension configured to detachably couple to the camera and to the mount,
   wherein the folding extension is configured to rotate about its own axis,
   wherein the vertical support is configured to rotate relative to the body, and the body is configured to rotate relative to the base; and
   a connector with a tightening lock that secures electrical connections between the battery and the action camera,
   wherein coupling the camera to the mount causes the battery to be electrically connected to the camera.

2. The action camera system of claim 1, wherein the camera comprises a male adaptor and the vertical support comprises a female adaptor configured to receive the male adaptor.

3. The action camera system of claim 1, wherein the camera comprises a 3D camera with two sets of lenses.

4. The action camera system of claim 1, wherein the folding extension comprises at least two arms and a joint connecting the two arms.

5. The action camera system of claim 1 wherein the folding extension further comprises wiring coupling the camera and the mount.

6. An action camera system comprising:
   a camera,
   a mount configured to detachably couple the camera, the mount comprising a battery, a base, a body, and a vertical support; and
   a folding extension configured to detachably couple to the camera and to the mount,
   wherein the vertical support is configured to rotate relative to the body, and the body is configured to rotate relative to the base;
   wherein the battery powers the camera when the camera is coupled to the mount;
   wherein the camera comprises a 3D camera with two sets of lenses; and
   wherein the two sets of lenses are configured to rotate about a common axis and relative to one another.

7. An action camera mount comprising:
   a base comprising a battery;
   a mechanical connector coupled to the base and configured to couple to an action camera;
   a handle coupled to the body; and
   a folding extension configured to detachably couple to the action camera and to the mechanical connector,
   wherein the mechanical connector comprises a connector with a tightening lock that secures electrical connections between the battery and the action camera.

8. The action camera mount of claim 7, wherein the mechanical connector comprises a female adaptor configured to receive a male adaptor of an action camera.

9. The action camera mount of claim 8, wherein the mechanical connector is configured to rotate relative to the body when the handle is in an open position.

10. The action camera mount of claim 7, wherein the base is configured to couple to a helmet, a harness, an armband, a board, or a ski pole.

11. The action camera mount of claim 7, further comprising an armband configured to secure a smartphone.

12. The action camera system of claim 7 wherein the folding extension further comprises wiring coupling the camera and the battery.

13. An action camera mount comprising:
   a base, wherein the base houses a battery and wherein the base comprises a mechanical connector configured to detachably couple an action camera, wherein the mechanical connector comprises a connector with a tightening lock that secures electrical connections between the battery and the action camera; and an adapter comprising a sleeve configured to encircle a ski pole underneath a handle of the ski pole to detachably couple the action camera mount to the ski pole.

14. The action camera mount of claim 13, further comprising a computer, a display and user interface.

15. The action camera mount of claim 14, wherein the display is disposed at a top of the base and the ski pole.

16. The action camera mount of claim 15, wherein the sleeve is disposed at the bottom of the base.

17. The action camera mount of claim 13, further comprising a collapsible extension, wherein the base is detachably coupled to an action camera through the collapsible extension.

* * * * *